US011257103B2

(12) United States Patent
Milton

(10) Patent No.: US 11,257,103 B2
(45) Date of Patent: *Feb. 22, 2022

(54) DEVICE-DWELL GRAPHS

(71) Applicant: PlaceIQ, Inc., New York, NY (US)

(72) Inventor: Stephen Milton, Lyons, CO (US)

(73) Assignee: PLACEIQ, INC., New York, NY (US)

(*) Notice: Subject to any disclaimer, the term of this patent is extended or adjusted under 35 U.S.C. 154(b) by 16 days.

This patent is subject to a terminal disclaimer.

(21) Appl. No.: 16/782,999

(22) Filed: Feb. 5, 2020

(65) Prior Publication Data

US 2020/0286111 A1 Sep. 10, 2020

Related U.S. Application Data

(63) Continuation of application No. 15/786,115, filed on Oct. 17, 2017, now Pat. No. 10,592,914, which is a continuation-in-part of application No. 15/152,157, filed on May 11, 2016, now Pat. No. 10,318,973, and a continuation-in-part of application No. 15/009,053, filed on Jan. 28, 2016, now Pat. No. 9,483,498, and a continuation-in-part of application No. 14/802,020, filed on Jul. 17, 2015, now Pat. No. 10,235,683, and a continuation-in-part of application No. 14/667,371, filed on Mar. 24, 2015, now Pat. No. 10,262,330.

(60) Provisional application No. 62/408,960, filed on Oct. 17, 2016, provisional application No. 62/160,193, filed on May 12, 2015.

(51) Int. Cl.
| | | |
|---|---|---|
| G06Q 30/02 | (2012.01) |
| H04W 4/021 | (2018.01) |
| H04W 4/029 | (2018.01) |
| G06F 16/29 | (2019.01) |
| G01S 5/02 | (2010.01) |
| H04L 67/306 | (2022.01) |

(52) U.S. Cl.
CPC ........ *G06Q 30/0205* (2013.01); *G06F 16/29* (2019.01); *G06Q 30/02* (2013.01); *H04W 4/021* (2013.01); *H04W 4/029* (2018.02); *G01S 5/0252* (2013.01); *H04L 67/306* (2013.01)

(58) Field of Classification Search
CPC ...................... G06F 30/0205; G06Q 30/0205
See application file for complete search history.

(56) References Cited

U.S. PATENT DOCUMENTS

2017/0091923 A1* 3/2017 Siercks ................. G01C 11/02

* cited by examiner

*Primary Examiner* — Van H Oberly
(74) *Attorney, Agent, or Firm* — Pillsbury Winthrop Shaw Pittman LLP

(57) ABSTRACT

Provided is a process that determines a device-dwell graph based on noisy reported geolocations for mobile computing devices.

20 Claims, 10 Drawing Sheets

DEVICE-DWELL GRAPHS

CROSS-REFERENCE TO RELATED APPLICATIONS

The present patent filing claims is a continuation of U.S. patent application Ser. No. 15/786,115, filed 17 Oct. 2017, titled DEVICE-DWELL GRAPHS, which claims the benefit of U.S. Provisional Patent Application 62/408,960, filed 17 Oct. 2016, titled DEVICE DWELL GRAPHS, and is a continuation-in-part of U.S. patent application Ser. No. 15/152,157, titled PROBABILISTIC CROSS-DEVICE PLACE VISITATION RATE MEASUREMENT AT SCALE, filed 11 May 2016, which claims the benefit of U.S. Provisional Patent Application 62/160,193, titled PROBABILISTIC JOIN BETWEEN TWO CUSTOMER ACTIVITY DATA SETS, filed 12 May 2015; is a continuation-in-part of U.S. patent application Ser. No. 14/667,371, titled LOCATION-BASED ANALYTIC PLATFORM AND METHODS, filed 24 Mar. 2015; is a continuation-in-part of U.S. patent application Ser. No. 15/009,053, titled APPARATUS AND METHOD FOR PROFILING USERS, filed 28 Jan. 2016; is a continuation-in-part of U.S. patent application Ser. No. 14/802,020, titled Analyzing Mobile-Device Location Histories To Characterize Consumer Behavior, filed 17 Jul. 2015. Each afore-listed patent filing is hereby incorporated by reference in its entirety.

BACKGROUND

1. Field

The present inventions relate generally to computer systems for large-scale data analytics and, more specifically, to computer systems for inferring places of interest visited by mobile computing devices in the face of noisy, relatively low-accuracy geolocation measurements by the mobile computing devices.

2. Description of the Related Art

Geolocation analytics platforms are generally used to understand human behavior. Such systems map data about places to geographic locations and then this mapping is used to analyze patterns in human behavior based on people's presence in those geographic locations. For example, researchers may use such systems to understand patterns in health, educational, crime, or political outcomes in geographic areas. And some companies use such systems to understand the nature of their physical locations, analyzing, for instance, the demographics of customers who visit their stores, restaurants, or other facilities. Some companies use such systems to measure and understand the results of TV advertising campaigns, detecting changes in the types of customers who visit stores following a campaign. Some companies use geolocation analytics platforms to target content to geolocations, e.g., selecting content like business listings, advertisements, billboards, mailings, restaurant reviews, and the like, based on human behavior associated with locations to which the content is directed. In many contexts, location can be a useful indicator of human behavior.

Existing geolocation analytics computer systems often suffer from inaccurate geolocation measurements from mobile computing devices. Often, mobile computing devices report their geolocation with more significant digits than is warranted by the geolocation measurement made by the mobile computing device, and even when the number of significant digits is appropriate to the accuracy of the measurement technique, the amount of error is often relatively large relative to the accuracy needed for the types of determinations that would be useful to make based on the geolocations, e.g., which place of interest is being visited by the mobile computing device. Inaccuracies can arise from inherent limitations in the type of measurement made (e.g., cellular triangulation, based on GPS signals, or based on Bluetooth™ or WiFi™ beacons), nearby structures blocking or reflecting wireless signals, and noise from other wireless transmitters. As a result, it can be difficult to determine which place a mobile computing device is visiting, e.g., several buildings in on a block may all be within a range of uncertainty for reported geolocations. The problem is compounded at scale, when hundreds of geolocations are reported for each of millions of mobile computing devices potentially at any of hundreds of thousands of places of interest.

SUMMARY

The following is a non-exhaustive listing of some aspects of the present techniques. These and other aspects are described in the following disclosure.

Some aspects include a process that determines a device-dwell graph based on noisy reported geolocations for mobile computing devices.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
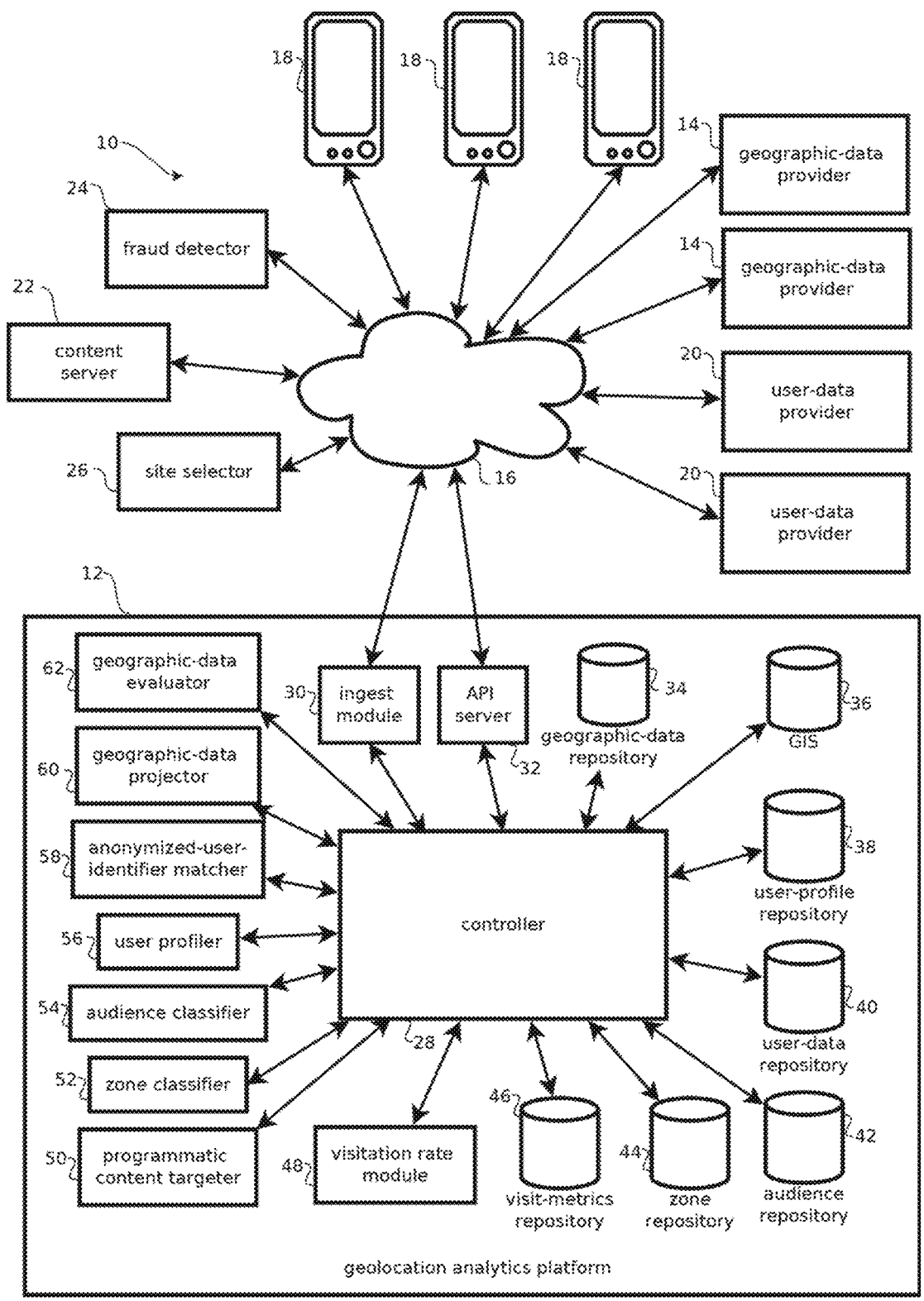
FIG. 1 shows an example of a computing environment having a location analytics platform consistent with some embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of geolocation data analytics. Indeed, the inventors wish to emphasize the difficulty of recognizing those problems that are nascent and will become much more apparent in the future should trends in industry continue as the inventors expect. The inventors also wish to emphasize that certain techniques described below required insights that span multiple disciplines that often do not interact, including data analytics, computer science, and geo-informatics. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments implement any of the various permutations of the below-described techniques to organize spatial and temporal data in a graph to rapidly and accurately determine most likely dwell locations (e.g., places determined to have been visited for more than a threshold amount of time (like 2 minutes, 5 minutes, 15 minutes, or one hour) with more than a threshold probability (like 50%, 80%, 90%, or 95%) for a set of visits or other geolocations reported by a mobile computing device. These techniques are described below in detail with reference to FIGS. 7-9, after describing a system in which the approach may be implemented and various upstream and downstream processes with reference to FIGS. 1-6. The techniques below, however, are not limited to the implementations using all of the of the various upstream and downstream processes (or the descried system) and have other uses in other domains, which is not to suggest that any other feature may not also be varied. In some implementations, the system continually (e.g., weekly, daily, hourly, or more often, like in response to new data) aggregates new visit data and produces evolving results.

Some embodiments ingest large amounts of raw movement data (e.g., the logs described below containing time-stamped geolocations) layered over a relatively rich basemap of high-fidelity places (e.g., the places of interest or tiles in the below-described geographic information system (GIS), which may include a hierarchical taxonomy of places of interest associated with bounding polygons defined by latitude and longitude coordinates (e.g., with 10 or 1 meter or better accuracy resolution), like the locations and boundaries of auto dealerships, retail stores, municipal boundaries, land use zoning, transit routes, roads, residential parcels, and the like). With this ingested, layered data, some embodiments implement a suite of algorithms to cleanse this data (examples of which are described below) and derive a device's location activity over time (e.g., with the techniques described in the applications incorporated by reference below). Some embodiments output a dataset that is referred to as Location Activity Data and that represents a cleansed historical record of places each device likely visited. This datasets provides a foundation for some of the downstream features in the larger system described below, including the below-described determinations of residential dwellings. Or some embodiments may use this data to other ends, different from those described below, which is not to suggest that any other feature may not also be varied.

Some embodiments may implement a pipeline that ingests time-stamped, device-identified, geolocation coordinates and outputs a sequence of places visited (e.g., "dwells," or places of interest that likely correspond to a collection of (potentially noisy) geolocations relatively close to one another in time and space). The dwells pipeline may take the visitation stream data for a device (over time) as input and transform and collapse this information into a "device-dwell graph." The nodes in this underlying graph data structure may represent locations at which a dwell has occurred. Location scores generated during visits (or other dwells), using a dynamic distancing model, may be used to generate spatial metrics or features for every node, in some embodiments.

The dynamic distancing model, in some embodiments, may determine when a device visits a given place, despite noisy and inaccurate geolocations reported by the device, e.g., due to GPS shadows and varying signal strengths from nearby wireless transmitters that often give rise to deltas in the range of 100 meters of reported to actual geolocation. In some cases, the model uses a three-stage process to attribute a device's presence to a place, both instantaneously (e.g., within 500 milliseconds, like within 200 milliseconds) for ad serving (or bidding in an ad auction) and as a post-processing step for behavioral analysis. In some implementations of the model, first a device receives a location signal. Then the range of the device is identified (e.g., based on historical error logged at the location, or based on a method of location determination, like cell tower triangulation, versus identifiers of wireless transmitters in local area networks or Bluetooth beacons, versus GPS, which often vary in accuracy, speed, and client-side power consumption). Lastly, client or server side, the precise place being visited is determined by laying the projected location against a relatively accurate base map (e.g., place polygons in the GIS below).

In some cases, probabilities may be calculated for each of a set of polygons representing places within some threshold distance (like a radius of the range) of (or grid square containing) a group of reported geolocations from given mobile computing device determined to be clustered in time and space (e.g., within a radius measured relative to a measure of central tendency of the cluster or grid square containing the value yielded by the measure of central tendency). In some cases, the place-by-place probabilities may be based on a weighted combination of factors, e.g., attributes of a profile of a user indicating a scored propensity to visit a place having attributes of the place represented by the polygon, an amount of visits to the place at times in the cluster of geolocation, past visits by the device to the place, an amount of overlap between a convex hull of the cluster and the polygon, a density of the cluster, a Euclidian geographic distance between a measure of central tendency (e.g., a centroid) of the geolocations in the cluster and a closest perimeter or centroid of the place, an amount of geolocations in the cluster, and confidence radii associated with reported geolocations. In some cases, the place may be determined by modeling reported geolocations as a Gaussian process. Some embodiments may infer a device's geolocation with a Kalman filter applied to reported geolocations. Some embodiments may infer the place visited with the techniques described in U.S. patent application Ser. No. 14/802,020 (e.g., modeling visits with a hidden Markov model), U.S. patent application Ser. No. 15/152,157 (e.g., using the techniques for identifying a residential dwelling to identify other types of places visited), or U.S. patent application Ser. No. 15/146,605 (e.g., using the described techniques for determining a visit graph and visit co-occurrences), each of which is incorporated by reference herein.

Some embodiments generate time-based features for every node in the graph. In some embodiments, edges connect neighboring (spatial) nodes that some embodiments model with a significant probability (e.g., having greater than a threshold probability of being visited) during a visit. In some implementations, edges reflect co-occurrences in a visit. This is expected to result in the resulting device-dwell graph having strongly connected components, where each connected component captures repetitive behavior for that device over time. A connected component is used, in some cases, as a candidate dwell, and nodes within the connected component represent the candidate locations (e.g., tiles, places of interest, or interior of a cluster hull) for that dwell. Using the spatial and time-based features for these connected components, some embodiments may then extract likely dwells for a device.

The device-dwell graph may be used for a variety of purposes. In some cases, content may be selected to send to devices based on these dwells, users associated with devices may be profiled based on these dwells, users associated with devices may be placed in audiences based on these dwells, security risks may be scored based on these dwells, and identifiers of different devices may be mapped to one another based on these dwells, among other uses. For instance, for home dwells, some embodiments may implement a residential classifier on the nodes of the device-dwell graph, which classifies the locations in a basemap as residential or non-residential. Adding this as a feature to the device-dwell graph, some embodiments may select the most likely home dwell for a device, e.g., using the techniques described in U.S. patent application Ser. No. 15/152,157 for identifying a residential dwelling.

One family of use cases relates to advertising. Often companies attempt to measure the effectiveness of their marketing efforts in driving certain behavior. For instance, it is often desirable to measure the effect of advertisements or articles on the number of people physically visiting a business or other geographic place. Companies often adjust their marketing strategy in response to such measurements, e.g., to favor strategies empirically measured to produce more visits over strategy demonstrated to be less effective.

The advent of the internet and geolocation services on mobile devices gave rise to a particularly effective mechanism for keeping track of which people were exposed to which marketing materials. Using techniques like those described in U.S. patent application Ser. No. 13/769,736, the contents of which are hereby incorporated by reference, marketers often attempt keep track of who is exposed to content and whether those exposed to the content physically visited any place in a set of geolocations (e.g., one or more retail store locations). Often visits are detected based on geolocations reported by a mobile computing device carried by the consumer when visiting a store, e.g., their cell phone. As a result, marketers can measure place visitation rates (e.g., lift) attributable to marketing efforts.

These techniques, however, often suffer from a number of problems that arise due to the nature of networking protocols and the scale of data implicated in more advanced campaigns. In many cases, an individual consumes content on several computing devices (e.g., their home desktop computer and their mobile phone), and networking protocols often obscure which computing device is being used from the server and that the computing devices are shared by a single person. For instance, many local area networks conceal the Internet Protocol (IP) address of the client device with an approach called network address translation, by which a set of devices on the local area network share a single public IP address exposed to the rest of the internet. Further, even when IP addresses or other device identifiers (e.g., MAC addresses, cookies, or device fingerprints, universal device identifiers (UDID), advertising device identifiers (ADID), or various client-side storage identifiers) are exposed to the server, server-side processes often have no reliable way of determining that different identifiers correspond to a single person using multiple devices (e.g., a cell phone, tablet computer, set-top box, and desktop computer). The analysis is complicated by the amount of people, devices, impressions, and visits, implicated in commercially relevant campaigns, which can span entire countries and reach millions of users, involving hundreds of thousands of visits at hundreds of geolocations and millions of impressions.

To mitigate some, and in some cases all, of these issues, some embodiments may probabilistically match a set of computing devices to an individual, such that when one of those computing devices is carried by the individual into a geolocation (like a cell phone carried into a retail store), and a geolocation is reported by the device, the visit can be correlated with records of content having been sent to one or more other computing devices matched to the same user. Further, some embodiments may execute these matches in a way that accommodates much larger data sets and more precise matching that many traditional techniques. To these ends, and others, FIG. 1 illustrates a computing environment 10 having an geolocation analytics platform 12 that, in some embodiments, has a visitation rate module 48 operative to implement these techniques, in some cases, by performing the processes described below with reference to FIGS. 5 and 6. These techniques operate synergistically, in some use cases, with a number of other inventions described below before addressing the features of the visitation rate module 48 in detail.

For example, traditional geolocation analytics platforms are not well suited for performing complex analyses on large data sets, as often arise in the context of analyzing web-scale data sets describing user behavior on a network. In many cases, simplifying assumptions are made to render the analysis more tractable for available computers and software, but these assumptions can give rise to various biases and misleading results that can skew the results of analyses.

One noteworthy example of such a misleading result is Simpson's paradox, where an analysis may reveal a particular effect in a population, but when the analysis is repeated for groups within that population, the effect can disappear or even reverse. In some cases, the group-to-group variation overwhelms the effect caused by a treatment, making the effects of the treatment on the various groups appear different from what is actually happening.

Yet it is common to ignore this issue and other sources of bias because, particularly for stochastic analyses of large data sets that reveal themselves over time, it can be difficult to consistently and reliably disaggregate control and treatment segments of the population. The difficulty is compounded when members of groups at issue have intersecting sets of members, when the number of groups is relatively large, and when the members of the population appear inconsistently over time. Further challenges arise from efforts to avoid selection bias, as often happens when users' behaviors on networks makes certain groups more likely to be represented in a sample.

To mitigate these issues, some embodiments include a module that selects control collections to measure against when assessing the effect of sending content (like advertisements, advocacy, health information, etc.) to a population that includes one or more targeted groups, where population definition and content distribution are aided by records in network logs, and content is distributed over networks to user computing devices. In some embodiments, such effects are measured by inferring the presence of users at places of interest based on geolocation data in network logs. Through careful selection of control collections, some embodiments are operative to distinguish the effect of the content from the effect of targeting. In some cases, embodiments mitigate the effect of selection biases that arise as a result of targeting based on past network behavior. Some embodiments are configured to perform these techniques on very large data sets, with complex collections of overlapping groups of targeted users, through the use of operations designed to expedite computer operations by which testing is administered. That said, not all embodiments provide these benefits, as several independently useful inventions are described herein. Examples of the control collection selection process are described below with reference to FIG. 4, after describe the environment in which the process is performed and innovations that operate synergistically with the process.

Embodiments of the geolocation analytics platform 12 may be implemented with one or more of the computing devices described below with reference to FIG. 10, e.g., by processors executing instructions stored in the below-described memory for providing the functionality described herein. FIG. 1 shows a functional block diagram of an example of the geolocation analytics platform 12. While the functionality is shown organized in discrete functional blocks for purposes of explaining the software and hardware by which the geolocation analytics platform 12 may be implemented in some embodiments, is important to note that such hardware and software may be intermingled, conjoined, subdivided, replicated, or otherwise differently arranged relative to the illustrated functional blocks. Due to the size of some geographic data sets (which may be as large as 100 billion content requests or geolocations, or larger, in some use cases), some embodiments may include a plurality of instances of the geolocation analytics platform 12 operating concurrently to evaluate data in parallel and some embodiments may include multiple instances of computing devices instantiating multiple instances of some or all of the components of the geolocation analytics platform 12, depending on cost and time constraints.

The geolocation analytics platform 12 may be understood in view of the exemplary computing environment 10 in which it operates. As shown in FIG. 1, the computing environment 10 further includes a plurality of geographic-data providers 14, the Internet 16, a plurality of mobile user devices 18, a plurality of user-data providers 20, a content server 22, a fraud detector 24, and a site selector 26. While a relatively small number of the below-described components are illustrated, it should be understood that embodiments are consistent with, and likely to include, substantially more of each component, such as dozens of geographic-data providers 14 and user data providers 20, hundreds of fraud detectors 24, content servers 22, and site selectors 26, and millions or tens of millions of user mobile devices 18. Each of these components may communicate with the geolocation analytics platform 12 or one another via the Internet 16. Some such communications may be used to either provide data by which audiences are classified according to geolocation history and other parameters, and some embodiments may use classified audiences for various purposes, such as serving content, detecting financial fraud, selecting real-estate sites, or the like. The components of the computing environment 10 may connect to one another through the Internet 16 and, in some cases, via various other networks, such as cellular networks, local area networks, wireless area networks, personal area networks, and the like.

FIG. 1 shows three geographic-data providers 14, but again, embodiments are consistent with substantially more instances, for example, numbering in the hundreds of thousands. The geographic-data providers 14 are shown as network connected devices, for example, servers hosting application program interfaces (APIs) by which geographic data is requested by the geolocation analytics platform 12, or in webpages from which such data is retrieved or otherwise extracted. It should be noted, however, that in some cases the geographic data may be provided by other modes of transport. For instance, hard-disk drives, optical media, flash drives, or other memory may be shipped by physical mail and copied via a local area network to on-board memory accessible to the geolocation analytics platform 12. In some cases, the geographic data is acquired in batches, for example, periodically, such as daily, weekly, monthly, or yearly, but embodiments are consistent with continuous (e.g., real-time) data feeds as well. Thus in some cases, the geographic-data providers 14 may provide geolocation histories that are non-contemporaneous (relative to when they are acquired) and span a relatively large period of time, such as several hours, several weeks, or several months in the past.

In many cases, the entity operating the geolocation analytics platform 12 does not have control over the quality or accuracy of the provided geographic data, as that data is often provided by a third-party, for instance, sellers of geocoded advertising inventory, the data being provided in the form of ad request logs from various publishers. For instance, the geographic-data providers 14 may be mobile website publishers, retargeting services, and providers of mobile device applications, or native apps. In some cases, the geographic data comprehensively canvasses a large geographic region, for example, every zip code, county, province, or state within a country, or the geographic data may be specific to a particular area, for example, within a single province or state for data gathered by local government or local businesses. Publishers acting as the provider of the geographic data may be an entity with geocoded advertising inventory to sell, e.g., ad impressions up for auction (e.g., logged over time) that are associated with a geographic location at which the entity represents the ad will be presented. In some cases, pricing for such advertising inventory is a function, in part, of the quality and accuracy of the associated geographic locations.

In some cases, the geographic-data providers 14 may provide location history data (e.g., from the mobile devices 18), such as ad request logs indicating, for instance, a plurality of requests for advertisements from publishers (e.g., operators of various websites or mobile device native applications), each request being for an advertisements to be served at a geolocation specified in the request. The geographic location specified in a given request may be used by an advertiser to determine whether to bid on or purchase the right to supply the requested advertisement, and the amount an advertiser wishes to pay may depend on the accuracy and quality of the identified geolocation. These location history records may contain a plurality of such requests, each having a geolocation (e.g., a latitude coordinate and a longitude coordinate specifying where a requested ad will be served), a unique identifier such as a mobile device ID (e.g., a device identifier of a end user device 18 upon which the ad will be shown) and a timestamp. In some cases, the device identifier may be a Unique Device Identifier (UDID) or an advertiser or advertising specific identifier, such as an advertising ID.

In FIG. 1, three mobile user devices 18 are illustrated, but it should be understood that embodiments are consistent with (and most use cases entail) substantially more user devices, e.g., more than 100,000 or more than one million user devices. The illustrated user devices 18 may be mobile handheld user devices, such as smart phones, tablets, or the like, having a portable power supply (e.g., a battery) and a wireless connection, for example, a cellular or a wireless area network interface, or wearable user devices, like smart watches and head-mounted displays. Examples of computing devices that, in some cases, are mobile devices are described below with reference to FIG. 10. User devices 18, however, are not limited to handheld mobile devices, and may include desktop computers, laptops, vehicle in-dash computing systems, living room set-top boxes, and public kiosks having computer interfaces. In some cases, the user devices 18 number in the millions or hundreds of millions and are geographically distributed, for example, over an entire country or the planet.

Each user devices 18 may include a processor and memory storing an operating system and various special-purpose applications, such as a browser by which webpages and advertisements are presented, or special-purpose native applications, such as weather applications, games, social-networking applications, shopping applications, and the like. In some cases, the user devices 18 include a location sensor, such as a global positioning system (GPS) sensor (or GLONASS, Galileo, or Compass sensor) or other components by which geographic location is obtained, for instance, based on the current wireless environment of the mobile device, like SSIDs of nearby wireless base stations, or identifiers of cellular towers in range. In some cases, the geographic locations sensed by the user devices 18 may be reported to the content server 22 for selecting content based on location to be shown on the mobile devices 18, and in some cases, location histories (e.g., a sequence of timestamps and geographic location coordinates) are acquired by the geographic-data providers 20, which may include content providers. In other cases, geographic locations are inferred by, for instance, an IP address through which a given device 18 communicates via the Internet 16, which may be a less accurate measure than GPS-determined locations. Or in some cases, geographic location is determined based on a cell tower to which a device 18 is wirelessly connected. Depending on how the geographic data is acquired and subsequently processed, that data may have better or less reliable quality and accuracy.

In some use cases, the number of people in a particular geographic area at a particular time as indicated by such location histories may be used to update records in the geolocation analytics platform 12. Location histories may be acquired by batch, e.g., from application program interfaces (APIs) of third-party providers, like cellular-network operators, advertising networks, or providers of mobile applications. Batch formatted location histories are often more readily available than real-time locations, while still being adequate for characterizing longer term trends in geographic data. And some embodiments may acquire some locations in real time (e.g., within 2 seconds of a request), for instance, for selecting content (like an advertisement, review, article, or business listing) to be displayed based on the current location.

The user-data providers 20 may provide data about users that is not necessarily tied to geolocation, such as purchasing history, media viewing history, automotive records, social networking activity, and the like. In some cases, user-data providers 20 include credit card processors, banks, cable companies, or television rating services. In some embodiments, user-data providers include microblogging services, location check-in services, or various other social networks. In some cases, audience classification according to geolocation may be supplemented with such data, for instance, according to the appearance of various keywords in social network posts, linkages between users indicated by social networks, or patterns in buying or reviewing behavior. In some cases, various features may be extracted from such data and included in the analysis described below for identifying audiences.

The illustrated content server 22 is operative to receive a request for content, select content (e.g., images and text), and send the content for display or other presentation to a user. One content server 22 is shown, but embodiments are consistent with substantially more, for example, numbering in the thousands. In some cases, the content is advertisements and advertisements are selected or bid upon with a price selected based on the geographic location of a computing device upon which an advertisement will be shown, which may be indicated by one of the geographic-data providers/content servers, or such entities may also be a publisher selling the advertising inventory. Accordingly, the accuracy and quality of such geographic data may be of relevance to the parties selling or buying such advertising space. The selection or pricing of advertisements may also depend on other factors. For example, advertisers may specify a certain bid amount based on the attributes of the geographic area documented in the geolocation analytics platform 12, or the advertiser may apply various thresholds, requiring certain attributes before an advertisement served, to target advertisements appropriately.

Some embodiments include a fraud detector 24 which may include an automated process run by a financial institution that detects anomalous behavior indicative of fraud based, in part, on correlations (or lack thereof) between financial transactions and patterns identified by the geolocation analytics platform 12. For instance, in some embodiments, the fraud detector 24 may submit a query to the geolocation analytics platform 12 based on a financial transaction, such as the purchase of a particular type of automobile, and the geolocation analytics platform 12 may respond with an audience classification of the user. In some embodiments the fraud detector 24 may determine whether the user who engaged in the financial transaction is likely to be a member of the audience for such purchases based on the data provided by the geolocation analytics platform 12. For example, a user who is not a member of an audience in Austin, Tex. that is present in Austin golf courses regularly, upon purchasing a set of golf clubs, may trigger a fraud alert, when the fraud detector receives a report for the geolocation analytics platform 12 that the user is not a member of an Austin, Tex., golf-playing audience. In some cases, the fraud detector may maintain an ontology of types of financial transactions and audiences associated with those transactions. Upon receiving a record of a financial transaction, the fraud detector may query audiences corresponding to the user, the location, and the time of the transaction, and determine whether the responsive audiences match those associated with the type of financial transaction in the ontology. Fraud may be detected based on the absence of such matches.

In some embodiments, the site selector 26 may categorize geographic areas as appropriate sites for various activities, such as positioning stores, allocating government resources, or distributing content into various zones based on geolocations frequented by audiences identified by the geolocation analytics platform 12. For instance, the site selector 26 may submit a request for zones in which members of a particular audience are present during lunch time and position restaurants in those zones.

In some embodiments, the geolocation analytics platform 12 may include a controller 28 that directs the activity of and routes data between the various components of the geolocation analytics platform 12. In some cases, the functionality of the controller may be divided into various processes, such as a separate controller for ingesting data, cleaning and normalizing data, classifying audiences and zones, targeting content, and evaluating the success of such targeting in driving visitation to various geographic locations. In some embodiments, activities other than programmatic content targeting may be performed as batch processes at times scheduled by the controller 28, such as daily or hourly, non-contemporaneously with when such data is used, to facility faster responses when the pre-processed data is used.

Some embodiments may include an ingest module 30 operative to retrieve data from the geographic-data providers 14 and user-data providers 20 via various APIs of such services. In some cases, such data may be routed by the controller 28 to a geographic data evaluator 62, examples of which are described in U.S. patent application Ser. No. 14/553,422, which is incorporated by reference in its entirety. The geographic-data evaluator may evaluate the quality of geographic data by geographic data provider and detect suspect, low-quality geographic data. Data from such providers with a history of providing low-quality data may be rejected from, or down-weighted in, the analyses described below, or such data providers may be stored with corresponding scores for purposes of bidding on the opportunity to serve advertisements or other content via such providers, for instance, in response to a content request for a website hosted by such a geographic-data provider.

Some embodiments may include an application program interface server 32, which may receive requests for information about audiences and geographic locations from the various entities operating devices 22, 24, and 26. In some cases, this may include requests by a third party content targeter for audiences corresponding to a current user device, at a current geolocation, requesting content at a current time (e.g., within the previous two seconds or so). In some cases, responsive data may include a list of audiences corresponding to these inputs or a list of scores for a plurality of audiences indicative of how well those inputs correspond to those audiences. In other examples, the request may include a request for an inventory of geographic areas corresponding to a specified audience, such as geographic areas or categories of places frequented by mobile device users who also frequent a given store or category of stores.

Some embodiments may include a geographic-data repository 34. The geographic-data repository 34, in some embodiments, stores geographic data from the geographic-data providers 14 and associated quality profiles of the geographic data, including measures of geographic data quality and accuracy provided by the geographic-data evaluator 62. In some embodiments, content providers, such as advertisers, or publishers, or others interested in the quality of geographic data from a given data provider 14 may query the geographic-data repository 34 for information output by the geographic-data evaluator 62.

Some embodiments may include a geographic information system 36. The geographic information system 36 may be configured to provide information about geographic locations in response to queries specifying a location or attribute of interest (or combinations thereof). In some embodiments, the geographic information system (GIS) 36 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example, approximately 100-meters per side, depending upon the desired granularity with which a geographic area is to be described. Tiles are, however, not limited to square-shaped tiles, and may include other tilings, such as a hexagonal tiling, a triangular tiling, or other regular tilings (e.g., for simpler processing), semi-regular tilings, or irregular tilings (e.g., for describing higher density areas with higher resolution tiles, while conserving memory with larger tiles representing less dense areas). In some cases, such tilings may facilitate relatively fast access to data, such as in-memory data structures responsive to queries without retrieving data from a hard disk, though embodiments are not limited to systems that provide this benefit, which is not to suggest that any other feature described herein may also be omitted in some embodiments.

In some cases, polygons corresponding to businesses and other places, points corresponding to points of interest, and lines corresponding to roads, railroad tracks, and the like may also be stored in the geographic information system 36 as geographic features. In some cases, attributes of tiles overlapping such features may be mapped to these features, e.g., in proportion to the amount of area of a tile occupied by the corresponding feature and as a weighted combination of multiple tiles in which such a feature may be disposed, for instance, with such weights being proportional to the amount area of the feature in each respective tile. In some cases, the described attributes of the tiles may be mapped directly to the features, e.g., with a record for each such a feature, or subset of such a feature, like a floor of a store, or aisle of a store, with the features grouped according to the tile in which they are disposed for relatively fast searching of features by first retrieving a group of features in a single tile. To simplify the mapping, in some cases, irregular tiles may correspond to the boundaries of features.

In some cases, the attributes of a geographic area change over time. Accordingly, some embodiments divide each tile (or feature, if characterized separately, for example) according to time. For instance, some embodiments divide each tile into subsets of some duration of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. In some cases the divisions of time are logically connected but are disjoint, for instance, morning and evening commute times may be classified in a single category of time corresponding to commuting. Each of these durations may be profiled at each tile.

In some embodiments, the geographic information system 36 includes a plurality of tile (or feature, if separately tracked) records, each such record corresponding to a different subset of a geographic area. Each tile (or feature) record may include an identifier, an indication of geographic area corresponding to the tile (which for regularly sized tiles may be the identifier from which location can be calculated or may be a polygon with latitude and longitude vertices, for instance), and a plurality of tile-time records. Each tile-time record may correspond to one of the above-mentioned divisions of time for a given tile, and the tile-time records may characterize attributes of the tile at different points of time, such as during different times of the week. Each tile-time (or feature-time) record may also include a density score indicative of the number of people in the tile at a given time. In some embodiments, each tile-time record includes an indication of the duration of time described by the record (e.g., lunch time on Sundays, or dinnertime on Wednesdays) and a plurality of attribute records, each attribute record describing an attribute of the tile at the corresponding window of time during some cycle (e.g., weekly). Some embodiments may include seasonal variants of such time designations, e.g., a set of time categories for the Christmas season, a set for Summer, and a set for the remainder of the year, constituting a type of time-tile record called a time-tile-season record.

The attributes may be descriptions of activities in which users (e.g., of third party services that provide data to the geolocation analytics platform 12) engage that are potentially of interest to advertisers or others interested in geographic data about human activities and attributes (e.g., geodemographic data or geopsychographic data). For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example, more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time. In some cases, attributes may be organized in a hierarchical ontology, for instance, businesses→retail→convenience_stores, or demographic→suburbanite→young_professional.

Thus, to use some embodiments of the geographic information system 36, a query may be submitted to determine what sort of activities users engage in at a particular block in downtown New York during Friday evenings, and the geographic information system 36 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Or a query may request tiles or features for which a given attribute score is exhibited. Attribute scores may be normalized, for example, a value from 0 to 10, with a value indicating the propensity of users to exhibit behavior described by that attribute. In some cases, scoring attributes according to a discrete set of normalized values may facilitate use of in-memory data structures that provide relatively fast access to information, though embodiments are not limited to systems that provide this benefit, which is not to suggest that any other feature described herein may also be omitted in some embodiments. Further, the attribute scores may be pre-calculated before such scores are used in an analysis, as some forms of analysis are relatively latency sensitive, such as content selection, which users are expected prefer to have happen within less than 500 milliseconds, while calculating attribute scores may take substantially longer.

In some cases, the user-profile repository 38 may store profiles of users of mobile devices 18 that are based on a user's geolocation history and in some cases data from user-data providers 20. In some cases, these user profiles may be created by a user profiler 56, an example of which is described in U.S. Pat. No. 8,489,596, the entire contents of which are incorporated by reference. The user profiler 56 may join the location histories of user devices corresponding to a user and tile records implicated by locations in those location histories to generate user profiles. Thus, users may be characterized according to the attributes of the places those users visit at the time the user visits those places. The generated user profiles may then be stored by the user profiler 56 in the user-profile repository 38.

The illustrated user-profile repository 38 includes a plurality of user-profile records, each record corresponding to the profile of a given user or a given mobile device 18. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose native application, a cell phone number, or some other value, which may be hashed to enhance user privacy).

Each user-profile record may also include a plurality of profile time (or profile-time-season) records indicating attributes of the user profile at different times during some cycle of time (e.g., portions of the week or month, or during other periods like those described above with reference to the geographic information system 36). In some cases, the profile-time records may correspond to the same durations of time as those of the time-tile records described above. Each profile-time record may include an indication of the duration of time being described (e.g. Thursdays at dinnertime, or Saturday midmorning) and a plurality of profile attribute records, each profile attribute record indicating the propensity of the corresponding user to engage in an activity, or exhibit a property, described by the attribute during the corresponding time of the profile-time record. The profile time records may allow tracking of when users tend to engage in a given activity (e.g., time of day, day of week, week of year). In some embodiments, the profile attribute records correspond to the same set of attribute records described above with reference to the geographic information system 36. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, publishers operating content server 22 may submit to the geolocation analytics platform 12 a query identifying one of the user-profile records, such as a hashed value of a user account number or phone number, and the geolocation analytics platform 12 may respond with the attributes of the corresponding user at the current time. In some embodiments, to further enhance user privacy, queries may be submitted for a specific attribute to determine whether to serve content corresponding to the attribute, or a query may request a binary indication of whether the attribute score is above a threshold.

In another example, the user-profile repository 38 may be used by the user profiler 56 to augment the records in the geographic information system 36. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf tend to be during various times of the day, such that content-providers can select content based on this information, or related services may be positioned nearby. In some embodiments, an index may be created for each user attribute at each of the above-described divisions of time in the geographic information system 36, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats as a source of relaxation for bankers on a billboard along that road in response.

In some cases, user profiles may be supplemented with data from the user-data providers 20. In some embodiments, a user-data repository 40 may store such data as it is acquired for further analysis. Further, in some embodiments, the quality of data from such data providers may be scored, and such scores may be associated with identifiers of the providers in the user-data repository 40. In some embodiments, this data may be down-weighted or rejected based on indicators of low-quality.

Some embodiments may include an audience repository 40 storing records by which audience membership may be determined. These records, in some cases may be created and accessed by an audience classifier 54 described below with reference to FIGS. 2 and 3. In some cases, audience membership is pre-calculated before a query is received, for example, for each recognize query within some parameter space, for instance, for every type of attribute record, pair of attribute records, or attribute record combined with larger geolocation area, like weekend golfers in the state of Texas. In some cases, parameters of models by which audience membership is determined may be stored in the audience repository 42, for example, learned parameters that are pre-calculated according to training sets. In some cases, an audience membership vector may be calculated based on a given geographic location, a given user identifier (e.g., a device identifier), and given time, with each component of the vector indicating membership in a corresponding audience. In some cases, membership may be binary, or some embodiments may score membership, for example from 0 to 10 depending on the probability of membership in the corresponding audience given the inputs. In some cases, each component of the audience vector may be calculated according to an audience member function that is a combination (e.g., weighted sum) of feature functions. Examples of such feature functions may include scores indicating whether a given user is currently within a tile having a particular attribute score (or collection of attribute scores) above a threshold, whether a given user has visited tiles having a particular attribute score above a threshold at particular times more than a threshold amount of times within some trailing duration, and the like. In some cases, a collection of audience vectors for each user may be stored in the respective user profile, e.g., as a sparse matrix having rows or columns indexed according to times and geolocations at which the corresponding audience vector applies. In some cases, identifying feature functions with predictive value can be relatively challenging given the relatively large, high-dimensional search space of candidate feature functions in many commercially relevant implementations. Techniques for discovering such features are described in greater detail below with reference to FIG. 2.

Some embodiments may include a zone repository 44, which may include zone records populated by a zone classifier 52. Zones may be geographic areas associated with audiences. For example, some embodiments may identify geographic areas that students at a local university tend to visit, with the corresponding audience being likely students at a given university or collection of universities, or those who are regularly at such universities (e.g., more than a threshold amount of times in a trailing duration of time). In some cases, the zone repository may include zone records that list tiles or time tiles likely to be visited by members of particular audiences. In some cases, zones may be classified according to an amount of mutual information between of events corresponding to audience membership and members of those audiences visiting particular tiles. In some cases, the mutual information may be calculated in terms of a conditional entropy, and tiles having the highest mutual information (for example, greater than a threshold amount of tiles, like a threshold percentage) may be selected for consideration as members of the zone for that audience.

In some cases, the selected candidate tiles may be clustered and resulting clusters may be designated as zones. Some embodiments may execute a density-based clustering algorithm, like DBSCAN, to establish groups corresponding to the resulting clusters and exclude outliers. Some embodiments may examine each of the geolocations reflected in the records and designate a tile as a core tile if at least a threshold amount of the other tiles in the records are within a threshold geographic distance or number of tiles. Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Outliers may be excluded from zones in some cases.

Some embodiments may include a visit-metrics repository 46 having records created by a visitation rate module 48. In some cases, the records may indicate the degree to which content targeted to particular users succeeded in driving those users to visit a targeted geographic location, for example, records indicating whether an advertisement targeted to users in a particular neighborhood succeeded in driving those users to visit a particular store. In some cases, the visitation rate module 48 may include the visitation rate module of U.S. patent application Ser. No. 13/769,736, the entire contents of which are incorporated by reference. In some cases, visitation rates may be adjusted to account for undercounting of undetected people, for example, those not employing cell phones while in the targeted location or employing cell phones that are not detectable, for instance, due to lack of signal quality for a particular type of handset or carrier. In some cases, such undercounting may correlate with various attributes of the user, including the user's mobile device, and some embodiments may adjust detected visitation rates to account for such undercounting. Some embodiments may measure a marginal increase in an amount of visits to a target geographic location likely to be attributable to targeted content. For example, some embodiments may identify audience members, serve targeted content to some of the audience members (e.g., a treatment group), and compare visitation amounts (e.g., calculate a statistically significant amount of difference between) between those audience members that receive the targeted content and those that did not (e.g., a control collection of the audience) to determine a marginal increase attributable to the targeted content. Feedback from such measurements may be used to tune audience classification algorithms or select among audiences, e.g., dynamically unselecting audiences for which a response fails to satisfy a visitation threshold. That said, not all embodiments necessarily provide these benefits, which is not to suggest that any other feature may not also be omitted in some cases.

Some embodiments may include a programmatic content targeter 50. In some cases, this module may automatically determine whether to provide content and which content to provide, in some cases at the time of the content request, based on classification of audiences or zones. In some embodiments, the programmatic content targeter 50 may programmatically determine audience membership and determine a bidding amount for submitting a bid to an online auction to provide an advertisement to a given user. To facilitate relatively fast responses to such time sensitive requests, some embodiments may pre-calculate zone classifications and audience classifications and index those classifications according to parameters of a content request (e.g., according to key values based on (such as hash values of) one or more of a device or user identifier, a geographic location, and a category of time corresponding to the time tile records). In some cases, bidding may be real-time, e.g., within less than 500 milliseconds of when an ad is requested, and often even sooner. In other cases, advertising space may be pre-purchased programmatically before ad requests, e.g., based on expected audience behavior in the coming hours or days. In other cases, other types of content may be programmatically targeted, e.g., business listings or articles based on audience membership. Programmatic targeting based on audience classification is expected to reduce labor costs relative to manual tuning and targeting of content. That said, not all embodiments necessarily provide these benefits, which is not to suggest that any other feature may not also be omitted in some cases.

Some embodiments may include an anonymized-user-identifier matcher 58, an example of which is described in U.S. patent application Ser. No. 14/334,066, the entire contents of which are incorporated by reference. In some cases, a user may switch mobile devices or be reassigned a device identifier. Re-creating a user profile for that user based on the new identifier can be time-consuming and particularly difficult at commercially-relevant scales. Accordingly, some embodiments of the matcher 58 may detect matches between geolocation patterns of a new user identifier and an old user identifier to assign that new identifier to an existing user profile when such matches are detected. This is expected to yield more accurate classifications of audiences based on more complete data for individuals using two different devices. That said, not all embodiments necessarily provide these benefits, which is not to suggest that any other feature may not also be omitted in some cases.

Some embodiments may further include a geographic-data projector 60, an example of which is described in U.S. patent application Ser. No. 13/938,974, the entire contents of which are incorporated by reference. In some cases, geographic-data providers may provide data at a relatively low resolution, e.g., census data reported at the zip code level. Some embodiments may un-evenly project such values onto higher-resolution geographic areas (e.g., some instances of the tile records or corresponding geographic features) within the low-resolution area based on a distribution of a population within that larger geographic area. Accordingly, some embodiments may enrich the records of the geographic information system 36 by which audiences and zones are identified with information that would otherwise be inapplicable or inaccurately applied. That said, not all embodiments necessarily provide these benefits, which is not to suggest that any other feature may not also be omitted in some cases.

Figure 2:
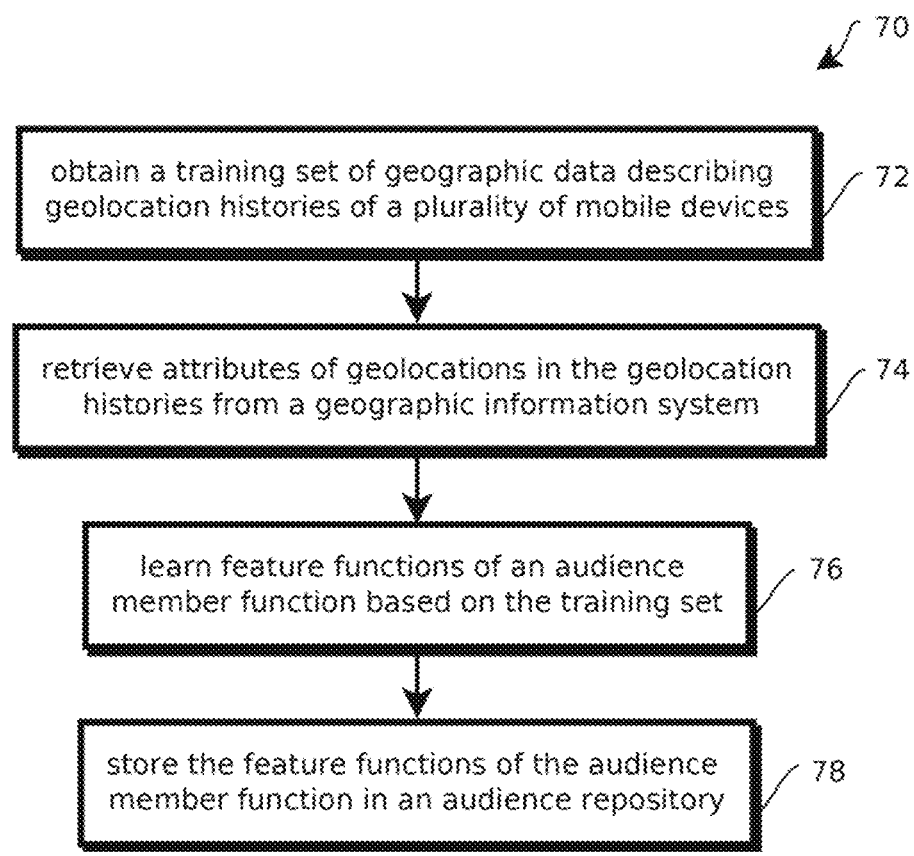
FIG. 2 shows an example of a process for learning an audience member function consistent with some embodiments of the present techniques.
Figure 3:
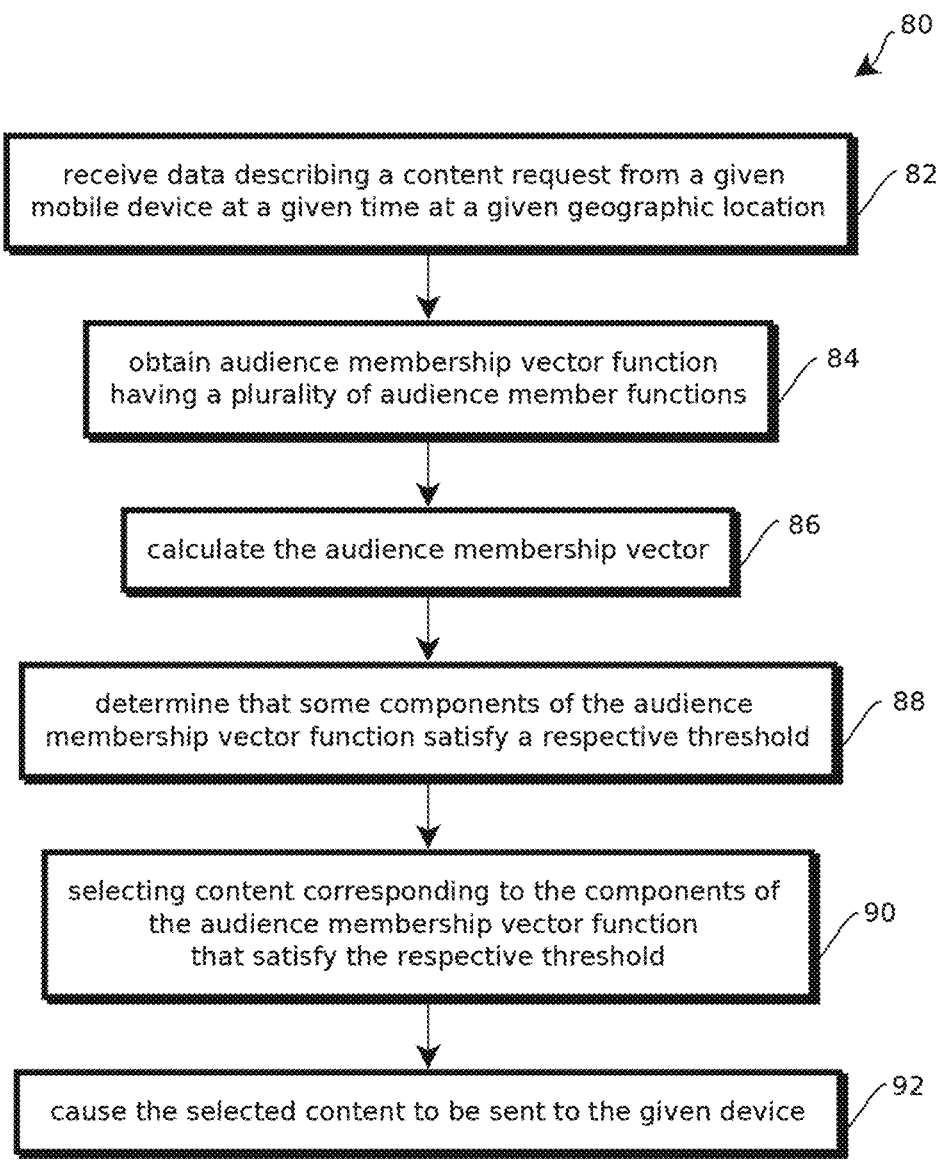
FIG. 3 shows an example of a process of targeting content based on an audience membership vector function including the audience member function of FIG. 2.

FIGS. 2 and 3 show techniques for modeling and detecting audiences. In some cases, the techniques may include an adaptive process by which features indicative of audience membership are programmatically learned, e.g., by iteratively modeling the audience and adjusting the model to reduce a measure of error produced by the model when applied to a training set of data in which audience membership status is known. Some embodiments may be configured to learn weights for combining (e.g., in a weighted sum, or in a neural net) features into a classification or score of probability of audience membership. Some embodiments may be configured for real-time model optimization by re-learning these parameters in the face of new data. Some embodiments may be configured to automatically discover, select, and score the importance of features in relatively high-dimensional data for classifying an audience.

FIG. 2 shows an example of a process 70 for learning an audience member function based on training data. In some cases, the model includes obtaining a training set of geographic data describing geolocation histories of a plurality of mobile devices, as indicated by block 72. Obtaining such a training set may include querying the user-profile repository 38 or the geographic information system 36 to identify users who have previously engaged in a targeted behavior. Targeted behaviors may serve as a training set selection criteria. In some cases, targeted behaviors include visiting a particular store within a threshold duration of time or with greater than a threshold frequency in a threshold duration of time. In another example a targeted behavior may include visiting a category of store according to such criteria. In another example, targeted behaviors may include exhibiting demographic attributes, like being a suburban young professional who plays golf on the weekend in the state of California more often than once a month over the trailing year. In some cases, training sets corresponding to relatively specific targeted behaviors may be retrieved relatively quickly with a distributed, scripted parallel program implemented with the techniques described in U.S. Provisional Patent Application 62/066,100, the contents of which are hereby incorporated by reference. Relatively fast, iterative exploration of candidate targeted behaviors with these techniques is expected to yield training sets suitable for creating well-crafted audiences. That said, not all embodiments provide this benefit, as various independently useful inventions are described herein.

The obtained training set may include geolocation histories, user profiles, and user data (e.g., financial transactions, television viewing patterns, social network activity, and the like) for each of a plurality of users who have exhibited the targeted behavior. In some cases, such data may include a relatively large number of dimensions, for example, including attribute scores for each of the above-described attributes, attribute scores for each of the above-attributes relating to behavior within some threshold duration of time, and attribute scores for each of the above described attributes relating to behavior with greater than a threshold frequency within a threshold duration of time. Further, such dimensions may include scores for the other user data, such as frequencies or amounts of financial transactions indicating purchases in a given category, such as frequencies or amounts of purchases within a threshold duration of time. Other examples may include amounts of adjacent nodes in a social network quantified with the above-described dimensions or frequency or amounts of viewing particular television shows or particular categories of television shows.

In some cases, the process 70 may include retrieving attributes of geolocations in the geolocation histories from a geographic information system, as indicated by block 74. In some cases, such attributes may be retrieved in the course of generating the above-described user profiles. In other cases, such attributes may be retrieved at the time of model training. For example, a given location history for a given user may indicate that the user within a given tile (for example, a particular tile for more than a threshold duration of time or more than a threshold frequency), and the attributes of that tile (or geographic feature, if independently tracked), or of that time tile may be retrieved from memory to serve as dimensions from which features are selected for an audience membership function. This technique may be used in cases in which the tiles correspond to or are overlaid with features, like polygons, corresponding to businesses in other geographic features to which attributes are mapped, by determining which features include the user's location and acquiring attributes of those features.

Some embodiments may learn feature functions of an audience member function based on the training set, as indicated by block 76. In some cases, audience member functions may be learned by training various types of machine learning classification or regression models, such as support vector machines, self organizing maps, binary classification decision trees, or regression decision trees.

By way of example, let device $d_z$ generate a content-request at time i within tile j, a request which may be represented as $r_{i,j,z}$. Some embodiments may obtain an audience-membership vector function $\bar{t}$ $(r_{i,j,z})$ where its kth dimension has value 1 if device $d_z$ is deemed to belong to the kth audience in the audience set, and 0 otherwise. Other embodiments may produce a more fine-grained score indicative of membership, e.g., a value between 0 and 1. Some embodiments may detect K discrete audiences.

In one simpler case, the audiences represented in vector $\bar{t}$ $(r_{i,j,z})$ are all categorical, audiences which are expressible as the intersection of tiles and time period categories, and device histories play no role in the audience membership functions ($f_k(\ )$). Thus, in this example, t $(r_{i,j,z})$=[$f_1$ (i, j), $f_2$ (i, j), . . . , $f_K$(i, j)]. In some cases, these functions may be pre-computed, before a content (e.g., ad) request is received and stored in sparse tables and cached in memory for fast retrieval.

In a more general case, some embodiments may compute $\bar{t}$ $(r_{i,j,z})$ based on more general features. To this end, some embodiments may calculate an audience membership functions $f_k(r_{i,j,z})$ and determine whether resulting values satisfy a respective ones of a collection of thresholds $t_k$ so that:

$$\bar{t}_k = \begin{cases} 1 & \text{when} \quad f_k(r_{i,j,z}) > t_k \\ 0 & \text{otherwise} \end{cases}$$

In some cases, thresholds $t_k$ may be heuristically established by an analyst and feature functions may be crafted by an audience designer. In other cases, such activities may be automated.

Some audience membership functions may consider richer features. In some cases, such functions may represent class posterior probabilities as follows:

$$f_k(r_{i,j,z}) = \rho(\text{audience} = c_k | \text{features}_{r_{i,j,z}})$$

Where features$_{r\_sub\_i,j,z}$ is the collection of features generated after knowing i, j, and z, or the device (or user, in the case where a given user has multiple correlated devices), time, and location of the request.

Some embodiments may model these probabilities with an adaptive basis function model approach, such as that described in chapter sixteen of K. Murphy. *Machine Learning: A probabilistic approach, Adaptive Computation and Machine Learning series* (The MIT Press, 2012), a chapter which is incorporated by reference. In some cases, such a model may be expressed as follows:

$$p(\text{audience} = c_k \mid \text{features}_{r_i,j,z}) \propto f_k(\text{features}_{r_i,j,z})$$

with the form:

$$f_k(\text{features}_{r_i,j,z}) = w_0 + \sum_{m=1...M} w_m \phi_m(i, j, z)$$

Where $\theta_m(i,j,z)$ is the m'th basis function that is learned from the training set, $w_m$ is the mean response in a region corresponding to the m'th basis function, and wo is an offset. In some cases, both weights and parameters of the basis function itself may be learned, in contrast to less expressive models that merely learn weights with a fixed basis function, like many simpler neural nets.

This formulation, in some cases, offers several advantages, allowing content targeters to robustly work with a combination of categorical and continuous features, large-dimensional spaces, missing values, kernel approaches, etc. Some embodiments may further include hierarchical models where probabilistic classifiers feed class posterior probabilities as features in this function. That said, not all embodiments provide these benefits, as various independently useful inventions are described.

In some cases, an audience member function may be learned by growing a binary regression or classification tree. In some cases, such a tree may be calculated, or grown, by recursively dividing a vector space occupied by the training data such that a training error is minimized in each division. In some cases, such divisions may be selected with a greedy algorithm that minimizes training error at a given iteration, rather than globally, to reduce computational complexity.

In some cases, the training data may be characterized as a collection of vectors, with each vector corresponding to an individual that engaged in the targeted behavior, and each component of such vectors corresponding to a candidate dimension from which a feature may be selected. As noted above, candid dimensions include, for example, various attribute scores of user profiles and tiles visited by users, in some cases, aggregated across trailing durations of time or quantified according to frequency within some trailing duration of time. In some cases, such vectors may have a relatively large number of dimensions, such as more than 10 for simpler cases, more than 1,000, and more than 10,000 for relatively rich data sets.

In some cases, a binary classification or regression decision tree may be grown by selecting a dimension and the value for that dimension in the vector space that minimizes or reduces a training error when the vector space is divided parallel to that dimension at that value, e.g., in a three-dimensional example, by a plane having a normal vector parallel to the chosen dimension and crossing an axis of the chosen dimension at the value chosen. Some embodiments may iterate through every dimension and every value (or between pair of adjacent values, when sorted) occupied by a vector in the training set in the respective dimension (as splits are expected to occur between values occupied by vectors) to calculate a training error for a split in vector space along that dimension between the respective values. Training errors for a plurality of candidate splits, each split being characterized by a pair identifying a value and a dimension, may be calculated, and some embodiments may select the split having the lowest training error.

In some cases, the training error may be characterized as an impurity measure indicative of the purity with which the candidate division in vector space, or split, separates vectors corresponding to audience members from vectors corresponding to non-audience members. For example, a division, or split, in which 9/10 vectors are audience members on one side and 8/10 vectors are non-audience members on the other may have a lower impurity measure relative to a division in which 6/10 vectors are audience members on one side and 7/10 vectors are non-audience members on the other side. Various impurity measures may be calculated, including a misclassification rate based on the proportion of vectors and each division that are misclassified if each division classifies according to a majority vote of vectors in the respective division. In other examples of an impurity measure, and entropy of audience members and non-audience members on each side of the division may be calculated or a Gini index may be calculated.

In some cases, to expedite processing, the evaluation of candidate splits may be executed in parallel by assigning different candidate dimensions and different candidate values within those dimensions to different computing nodes in a distributed computing network. For example, some embodiments may map candidate splits to one set of computing nodes and reduce impurity measures from the resulting regions with a different set of computing nodes, for instance, according to a MapReduce algorithm executed by a distributed computing network having a plurality of computing nodes, such separate computers or separate instances of virtual machines.

After a split, as a result of the split, the portion of vector space at issue may be divided into two regions divided in a selected dimension at a selected value. The division may be characterized as a node in a binary decision tree, the node corresponding to a split rule, like weekend golfer score greater than seven, and the two resulting regions may be characterized as edges extending from that node in a binary decision tree, each edge representing an outcome of the decision rule, like true or false. In some cases, the subregions corresponding to each of those edges may be recursively subjected to the above-described procedure for dividing a region of vector space such that the training error is minimized in the division of the portion of vector space at issue. Training vectors in one subregion may undergo the above process, and training vectors in the other subregion may separately undergo the above process, producing four sub-subregions. Such divisions may yield additional nodes in a decision tree corresponding to additional rules, for example, young professional attribute score less than three, and additional subdivisions of the vector space. This process may be repeated recursively until a stopping condition is satisfied in each branch of the binary decision tree.

A variety of stopping conditions may be evaluated before performing a split on a region of vector space. A determination may be made as to whether all vectors in the region of vector space are all members of the audience in the training set, or a determination may be made as to whether all vectors in the region of vector space are all not members of the audience in the training set. In either case, the region of vector space may not be further subdivided in response, and the resulting region may be designated as a leaf node indicating that vectors in the corresponding region are to be designated as audience members or not audience members, depending upon whether all members of the training set are audience members or not audience members. In another example of a stopping condition, some embodiments may count a number of training vectors in a candidate split or in a input region and decline to make the candidate split or further split the subregion in response to the count being less than a threshold value to avoid overfitting, e.g., with a large number of leaf nodes each corresponding to a single respective vector.

In some cases, the resulting leaf nodes of the binary decision tree may correspond to classifications of whether vectors in the regions of space described by those leaf nodes are audience members or not audience members. For example, if a majority of training vectors in a leaf node region are audience members, some embodiments may designate later-received, nontraining vectors (e.g., when the model is applied) in those regions as corresponding to audience members, and vice versa. The model may be applied by navigating the decision tree to a leaf node based on dimensions of a vector to be classified, and classifying the vector according to the leaf node's relative amount of audience member and non-audience member training vectors. In some cases, the designation may be associated with a confidence value corresponding to the impurity value of the region described by the leaf node.

In some embodiments, resulting decision trees may be pruned to reduce overfitting. For example, a training error may be calculated for each leaf node, the leaf nodes may be ranked according to training error, and those leaf nodes above a threshold position in the ranking, having the greater training errors, may be pruned from the tree.

In some embodiments, such decision trees may be relatively unstable and sensitive to relatively small changes in inputs. To mitigate such instabilities, some embodiments may perform a bootstrap aggregation by subsampling the training data, calculating binary decision trees on the subsamples in a plurality of iterations, and then aggregating the resulting plurality of decision trees to produce an aggregated binary classification decision tree.

The resulting binary classification decision tree (e.g., one or more per audience) may be stored in the audience repository, for example, by storing feature functions of the corresponding audience member function in the audience repository, as indicated by block 78. In some embodiments, such feature functions and the audience member functions to which they belong may be precalculated before audience classification is performed on nontraining data to facilitate relatively fast retrieval and classification. For example, audience member functions may be calculated daily or hourly for a particular geographic region in which a given content provider is interested, thereby providing relatively low latency audience classification that is responsive to changing conditions in user behavior.

FIG. 3 shows an example of a process 80 by which a request for content may be serviced by designating the request as corresponding to one or more audiences and selecting responsive content. In some embodiments, the process 80 includes receiving data describing the content requests from a given mobile device at a given time at a given geographic location, as indicated by block 82. In some cases, the request includes a device identifier that may be correlated to a user profile and location history, and a given time, and may be a timestamped geolocation, such as latitude and longitude, sensed by the mobile device, for example, at the time of a request for advertising content or other content.

Next, some embodiments may obtain an audience membership vector function having a plurality of audience member functions, as indicated by block 84. In some embodiments, some or all of the audience member functions may be learned with the process described above with reference to FIG. 2. In other cases, some of the audience member functions may be obtained with other techniques, such as hand-coded rules specifying particular time tiles that correspond to audiences. In some embodiments, the audience membership vector function may include a relatively large number of candidate audiences, such as more than 10, or more than 100, depending upon the granularity with which content is to be targeted. Relatively granular targeting is expected to facilitate selection of relatively highly customized content to which subgroups of populations are expected to be responsive. In some cases, the audience membership vector function may be retrieved from the audience repository 42, for example, by the audience classifier 54 at the direction of the programmatic content targeter 50, as shown in FIG. 1.

Next, some embodiments may calculate the audience membership vector, as indicated by block 86. In some cases, the request for content may be encoded as a vector, like those used in the training sets described above. For example, dimensions of the vector may include the current time, or corresponding time tile designation of the user, attributes of the user's current geolocation, such as tile attributes, and various attributes of a user profile or data in user location history of a user corresponding to a device identifier in the request for content. In some embodiments, for each dimension of the audience membership vector, a corresponding audience member function may be retrieved and calculated with the vector of the request as an input. In some cases, such calculation may include navigating a plurality of the binary classification decision trees produced with the above described techniques. In some embodiments, the request vector may be designated as corresponding to the respective audience based on whether a leaf node of the corresponding tree had a majority of training vectors in the audience or not in the audience (e.g., a majority in the audience means the input vector and corresponding request are classified as belonging to the audience, and vice versa).

Next, some embodiments may determine that some components of the audience membership vector function satisfy a respective threshold, as indicated by block 88. In some embodiments, each leaf node of a decision tree may include a confidence value, for example, indicating an amount of training error attributable to the respective leaf node. Request vectors mapped to a given leaf node may be associated with these confidence values, and the confidence values may be compared to a threshold corresponding to the respective audience described by the respective audience membership function of the audience membership vector function.

Next, some embodiments may select content corresponding to the components of the audience membership vector function that satisfy the respective threshold, as indicated by block 90. Some embodiments may rank responsive audiences based on confidence values, or some audiences may be deemed more valuable than others and may be selected even with lower confidence values. In some embodiments, each audience may be associated with a valuation score, and confidence values may be multiplied by the valuation scores to produce a ranking value from which responsive audiences are selected. In some embodiments, content may be mapped to multiple audiences, and audience ranking values may be aggregated according to content (for example, as a weighted sum) and the content ranked according to content ranking values. In some cases, the highest ranking content may be selected. In some cases, selecting content includes selecting a value that corresponds to content in another system, e.g., reporting audience membership by which another system retrieves content corresponding to the audience.

Next, some embodiments may cause the selected content to be sent to the given device, as indicated by block 92. Causing the content to be sent may include retrieving the content from memory and transmitting the content, sending instructions for the user device to retrieve the content from a third-party content hosting service, or sending data by which a decision to purchase the right to serve the content is made. In some cases, causing the content to be sent may include sending information upon which a bid in an advertising auction is calculated, for example, a binary value indicating audience membership that causes an advertiser to submit a bid in response.

In some embodiments, to expedite processing, calculation of the audience membership vector components may be executed in parallel, with each dimension being executed, for example, in a different thread or different computing node. In some embodiments, the component calculations may be mapped to a plurality of different computing nodes, and values of the components may be reduced by other computing nodes by comparing confidence values to threshold values, as described above, for example, with a MapReduce algorithm.

In some embodiments content, such as advertisements, business listings, articles, and the like may be selected according to correspondence with the responsive audiences. In some embodiments, content targeters may identify content in advance as being targeted to particular audiences. For example, an advertiser may wish to send a particular advertisement to young suburbanite professionals who golf on the weekends and frequent a particular store. In some cases, a training data set may be identified by querying existing records for users who have exhibited this targeted behavior. That training set may then be input to the process of FIG. 2 to train a model that identifies other users likely to engage in the targeted behavior as well. Later, when a new request for content is received, that request may be input into the resulting model, and audience membership may be detected, thereby indicating to an advertiser that the corresponding advertisement should be sent, as the user is likely to engage in the targeted behavior.

In some cases, when the groups (e.g., audiences) defined with the techniques above receive content, it is desirable to measure the effectiveness of the content in driving certain behavior, in some cases comparing multiple instances of content to one another with multiple treatments and a control collection. For instance, it is frequently useful to measure the effectiveness of content in driving people to visit places of interest (i.e., specified geographic locations), like a retailer's stores in an advertising market, schools in a municipality, hospitals in a city, venues for exercising, etc. To this end, some embodiments may selectively provide content to a treatment collection of users, while withholding the content from a control collection of users, and measure the difference in an amount of visits to the places of interest.

For instance, some embodiments may determine a place visitation rate (PVR), like that described in U.S. patent application Ser. No. 13/769,736, titled "Apparatus and Method for Identifying and Employing Visitation Rates," filed 18 Feb. 2013, the contents of which are hereby incorporated by reference. In some embodiments, for the exposed collection, the PVR is the number of exposed individuals who appear in the destination(s) of interest after being exposed, divided by the total number of individuals exposed to the content, in some cases, subject to constraints on the window of time in which a conversion must take place. For the control collection in some embodiments, the PVR is the number of unexposed individuals who appear in the destination of interest, divided by the total number of unexposed individuals in a population. In some cases, the PVR may be determined on a region-by-region, and group (e.g., audience) by group, and content-treatment by content-treatment basis. (The term "rate" should not be read as limited to a temporal rate and can include a ratio of users.)

Some embodiments may undertake such measurements in a manner that addresses one or more problems presented by traditional geolocation data analytics systems. Many older systems combine the lift (e.g., difference in PVRs between control and treatment) due to behavioral targeting (e.g., via the audience selection techniques above) and the lift due to exposure to the content (and in some cases an interaction between those two effects). Some embodiments may provide a disaggregated view of these two lifts. Second, many older systems suffer from various biases. For example, individuals in audiences often have already appeared in network logs by which those audiences were defined, and as a result, it is expected that they are more likely to appear in the future. Also, due to real-world complexities in the execution of content targeting campaigns (e.g., budget constraints, market conditions for ad inventory, etc.), it is common to not be able to expose everyone in the treatment collection to the content. Transferring unexposed individuals from the treatment collection to the control collection at reporting time may bias upward the control PVR. Embodiments are not limited to systems that address every one of these deficiencies, though, as solutions that mitigate individual problems are independently useful and are contemplated by the inventors.

The computational challenges are best understood with an appreciation for the complexity and scale of content-efficacy measurements supported by some embodiments. Some embodiments measuring the efficacy of content in driving certain behavior, e.g., among a relatively large number of audiences (and permutations of those audiences for members in multiple audiences) (like more than five, and in many cases more than 20), among a relatively large number of geographic areas and durations of time into which the content is sent (e.g., more than five, and in many cases more than 20 areas, like zip codes, cities, or counties). Further, the observed behaviors may also be relatively granular and complex measurements, e.g., embodiments may infer visits to geofences associated with a relatively large number of stores for a given retailer or class of retailers carrying a certain brand, which may entail detecting and analyzing visits to by any one of more than 20, and in many cases, more than 100 different geographic locations (e.g., defined by regular tiles and in some cases by bounding polygons). Further complexity arises from the scale of the populations subjected to the analysis, e.g., more than 1,000, and in many cases, more than 10,000 or 100,000 user computing devices may be included in a population subject to the analysis. Challenges also arise from the nature of the observable data, as analyses are often based on logged network communications for mobile computing devices (like smart phones, tablets, wearable computers, etc.), and reported device identifiers often appear intermittently in such logs and in some cases can be changed periodically for a given device.

Given these challenges, traditional data analytics systems are not well suited for selecting and effectively managing a control collection that 1) reliably does not receive a treatment; and 2) is selected with fewer biases than arise with the more common, relatively naïve approaches for control group selection in other, simpler forms of A/B testing in marketing and business intelligence.

For example, an individual x (or more precisely, a computing device identifier of the individual appearing in network logs) may belong to multiple audiences for which targeted content is being measured. In this case, if the procedure for forming a control collection is to simply hold out 100,000 individuals from a given audience (or intersection of audiences), it is possible for an individual to be in an unexposed group for that audience, but in an exposed group for another audience that is also part of the definition of which users-devices are to be targeted (as often arises when a targeted population is defined as the union of a large number of audiences). In this case, x is not an appropriate control subject for the first line item, at least in some embodiments (as some of the present techniques are independently useful and may also benefit simpler analysis).

An alternative, but still problematic, approach is a two-step technique. The technique begins by iterating through each group (e.g., audience or intersection or union of audiences) and randomly selecting a subset of individuals (or more precisely, computing device identifiers of the individuals appearing in network logs) to be members of a portion of a candidate control collection. Then, the portions of the candidate control collection may be joined, and members of the candidate control collection may be compared against the members of each group to remove any overlap, making it less likely that a control collection member is exposed to the treatment, essentially forcing an individual who is in any control collection to be in all control collections. The problem with this approach is that individuals who belong to multiple line items are more likely to be included in the control collections because they have multiple opportunities to be selected to be in them, which can give rise to a bias. If these individuals also have a higher probability of converting (because they belong to multiple line items), then the control collections are expected to have their PVRs biased upwards, and the treatment groups are expected have their PVRs biased downwards. (The description of this and the other "problems" of some approaches should not be construed as a disclaimer, as many of the present techniques are independently useful and benefit sub-optimal designs.)

Some embodiments may mitigate these and other challenges in generating simultaneous control collections for complex multi-audience tests.

In order to isolate (or reduce the interaction of) the effects of both the behavioral targeting and exposure to the content, some embodiments may distribute (or not distribute) content to, and collect data (e.g., later reported geolocations of mobile user computing devices) from, four collections:

a. (collection A) a receiver grouped-device collection that has user computing devices that are targeted (e.g., in virtue of being in one or more designated audiences) and are designated for exposure to the treatment (e.g., to receive the content);

b. (collection B) a receiver ungrouped-device collection that has user computing devices that are not targeted (e.g., are selected without regard to whether the devices belong to any particular audience) and are designated for exposure to the treatment;

c. (collection C) a reserve grouped-device collection that has user computing devices that are targeted (according to the same or similar criteria as is used to determine the receiver grouped-device collection) and are designated to not receive the treatment (e.g., to have the content withheld); and d. (collection D) a reserve ungrouped-device collection that has user computing devices that are not targeted and are designated to not receive the treatment.

Together, collections A and B constitute the receiver collections, collections B and C constitute the reserve collections, collections A and C constitute the grouped-device collections, and collections B and D constitute the ungrouped-device collections. To create the C collection, some embodiments may withhold device identifiers in the target group from exposure to the content, and to create the B collection, some embodiments may sample device identifiers (at random, e.g., pseudo-randomly) from network logs and expose those devices to the content.

With these collections, some embodiments may make a number of measurements:

a. determining lift due to exposure to the content among those in the target segments (e.g., by determining a difference between PVRs for the A collection and the C collection, i.e., a A vs. C PVR delta);

b. determining lift due to exposure to the content among those who are not targeted (e.g., by determining a difference between PVRs for the B collection and the D collection, i.e., a B vs. D PVR delta);

c. determining lift due to being in target segments among those exposed to the content (e.g., by determining a difference between PVRs for the A collection and the B collection);

d. determining lift for those not in the target segments among those exposed to the content (e.g., by determining a difference between PVRs for the C collection and the D collection);

e. determining an advantage targeted content distribution has over untargeted content distribution (e.g., arbitrarily distribution of advertising) (e.g., by determining a difference between the A vs. C PVR delta and the B vs. D PVR delta).

To generate the four groups, some embodiments may execute a sampling strategy in which: (1) the four groups are disjoint; and (2) device identifiers in exposed (or respectively, unexposed) groups remain in exposed (or respectively, unexposed) groups over time, notwithstanding intermittent appearance of device identifiers in network logs and audiences. Some embodiments may satisfy these criteria for all devices, or a sufficient amount of devices to yield usable results, e.g., permitting some relaxation depending on the statistical power of the measurement.

Consistency in exposure and treatment groups over time, in commercially relevant use cases, imposes significant computational complexity. The set of device identifiers in network logs and the groups (e.g., audiences) are expected to change intermittently. Ideally, the control collections reflect these changes, but this presents a challenge: If a device identifier x appears in an unexposed control collection of a targeted group in Week 1, disappears from the audience underlying that group in Week 2, but reappears in Week 3, ideally, at least some embodiments ensure that it is in an unexposed group in Week 3. This "chaining effect" or "path dependence," preferably, may be accounted for indefinitely (to the extent permitted by computing resources available) and may introduce various biases to the control groups.

To establish the various collections, some embodiments use hashing, instead of simple random sampling, as is more common in traditional techniques. Some embodiments hash each device identifier using a hash function selected for a propensity to produce pseudo-random results, such as a cryptographic hash function, like a provably secure cryptographic hash function. Some embodiments may input the device identifier into the md5 hash function, for instance, using the Python library hashlib, or other hash functions, like SHA-1, VSH, FSB, MuHASH, etc. For instance, the UDID "002ebf12-a125-5ddf-a739-67c3c5d20177," (expressed as a 40-character hex string), when input to the md5 hash function, yields a hash value of "9019be98c59e7438587168955b5f3662."

Then, some embodiments create the collections by interrogating pre-images of sets of hash values; e.g., the set of device identifiers that map to a particular set of hash values. Some embodiments may include additional device attributes in the hash input or use other device identifiers, either in the alternative or conjunctively, e.g., attributes of a user-agent string, other device identifiers, a device maker, a device model, an IP address, etc. In many use cases, it is expected that inputs that are consistent over time are to be preferred, though, to maintain consistency in collection assignments.

In some cases, ranges of hash values may be designated for each collection, and assignment or collection-look-up for a given device identifier may entail determining whether the hash function output based on the device identifier is greater than a minimum hash value for the range and less than a maximum hash value for the range. In some cases, the hash function has a fixed range of potential values that the hash function can output (e.g., 00000000000000000000000000000000 to ffffffffffffffffffffffffffffffff in hexadecimal), and the range is divided by a threshold, with values below the threshold indicating the device is in a control (i.e., reserve) collection and values above or equal to the threshold indicating the device is in treatment (i.e., receiver) collection that receives the content. In some cases, the hash values are mapped to collections in advance of calculating hash values on device identifiers. In some embodiments, the hash function is configured to output a binary value of 0 or 1, corresponding to false and true, and the result may be applied in an "if" statement, e.g., "if hash_function (device_ID):" then the device is in a control collection. Examples of such functions include a function that expresses an md5 hash function output in binary form and outputs a least-significant digit of the binary result.

Thus, some embodiments may hold out a certain set of device identifiers taken from the target groups (e.g., audiences) so that those devices never (or are less likely to) get exposed to the treatment (e.g., a content-targeting-strategy pair) during a measurement. The device identifiers in the target groups are candidates for exposure. For instance, for a given group (e.g., audience) among a definition of a targeted population (that may have multiple groups), the (collection A) receiver grouped-device collection may be the set of device identifiers in that group that are not withheld, and (collection C) the reserve grouped-device collection may be the set of device identifiers withheld in virtue of their hash values falling into a set of control collection hash values Similarly, some embodiments take random (e.g., pseudo-random) subsets of device identifiers appearing in the network logs (which may or may not be in the targeted groups) and place them in the (collection B) receiver ungrouped-device collection and the (collection D) reserve ungrouped-device collection, so that they get exposed or held out, respectively. Of note, that this process can be used for relatively complex definitions of targeted populations without reducing the rigor or complicating the execution or interpretation of the measurement.

Because embodiments use hashing and because the four sets of hash values are disjoint, it follows that the four collections A-D are disjoint. Furthermore, as long as the hash value assignments and device identifiers remain the same over time, no device identifier appearing in an exposed group are not expected to appear in an unexposed group, and vice versa.

Of note, substituting cryptographic hash functions that generate pseudorandom outputs for random selection is expected to afford significant reduction in the computational complexity of selecting and managing the various collections, as sets of hash values can be mapped to each collection, expediting assignment and look-up operations. It should be noted, though, that embodiments are not limited to systems that provide this benefit, as various other inventions described herein are independently useful.

In some cases, the network logs are the raw network logs containing a relatively large number of transactions, each transaction corresponding to an exchange between a server and a remote user computing device. Some of each of the transactions may be associated with a device identifier, a time-stamp, and data indicative of a geolocation of user computing device communicating with the server. In some cases, the network logs are ad request logs, or in other cases, they are logs for a server receiving API request from a native mobile application or web requests from a web browser. In some cases, the network logs are extractions from raw network logs or impression counts data that is generated as intermediate output audience generation, or any number of other sources containing device identifiers associated with exchanges between user computing devices and remote servers.

Device identifiers may take a variety of forms, e.g., Unique Device Identifiers (UDIDs), Core Foundation Universally Unique Identifier (CFUUID), browser or device configuration fingerprints, advertising identifier, media access control (MAC address), etc. In some cases, the device identifiers may be obtained with the techniques described in U.S. Provisional Patent Application 62/244,767, titled "BRANCHING MOBILE-DEVICE TO SYSTEM-NAMESPACE IDENTIFIER MAPPINGS," filed 22 Oct. 2015 and U.S. patent application Ser. No. 14/334,066, titled "Matching Anonymized User Identifiers Across Differently Anonymized Data Sets," filed 17 Jul. 2014, both of which are incorporated by reference.

Some embodiments may execute the techniques for collection assignment and look-up in a way that is sensitive to the latency constraints that arise in content distribution and in particular in real-time bidding systems for online ad auctions. Content selection typically happens within less than 500 milliseconds of a request, and in most commercial use cases, within less than 100 milliseconds. Studies have shown that even an extra 200 milliseconds of latency can significantly affect user engagement and content effectiveness. To make the computer system more responsive, some embodiments may select control collections in a batch process run in advance of the determination of whether to respond with content to any particular request from a member of the population in a measurement. In some embodiments, at content-request time, collection assignments may be determined relatively quickly with a Bloom filter configured to determine whether a device identifier corresponds to a particular collection or union of collections.

The number of computing devices in and complexity of the selection process in typical use cases are such that some embodiments may employ techniques to render the batch process tractable with reasonable amounts of computing resources. Some embodiments may include a pipeline that generates groups of device identifiers that can be pieced together to run a measurement (e.g., a campaign) that has the relevant control collection for each group. In some cases, the process is executed as a MapReduce job, e.g., with the Hadoop framework, with different segments of the data being sent to different computing devices that concurrently perform portions of the analysis and return responses for aggregation.

Some embodiments may take as an input: (1) for each group, the list of device identifiers belonging to that group; and (2) a list of device identifiers appearing in network logs from which the test population is to be taken and corresponding to the same (or a similar) period that was used to generate the groups (e.g., the audiences described above).

In some cases, the process for assigning the devices to the various collections is based on a set of configuration parameters: (1) the set of hash values corresponding to each of the collections; and (2) parameters specifying the time period used for audience generation.

Some embodiments may execute two Hadoop jobs as part of the pipeline: (1) based on impression counts data, determine the untargeted (or un-grouped) collections for control and treatment (e.g., the devices outside of the union of the various audiences selected, appearing in the network logs from which the audiences were defined during the period from which the audiences were taken) based on hash sampling of hashes of devices identifiers; and (2) based on the groups targeted, use hash sampling to determine the targeted collections for control and treatment.

Figure 4:
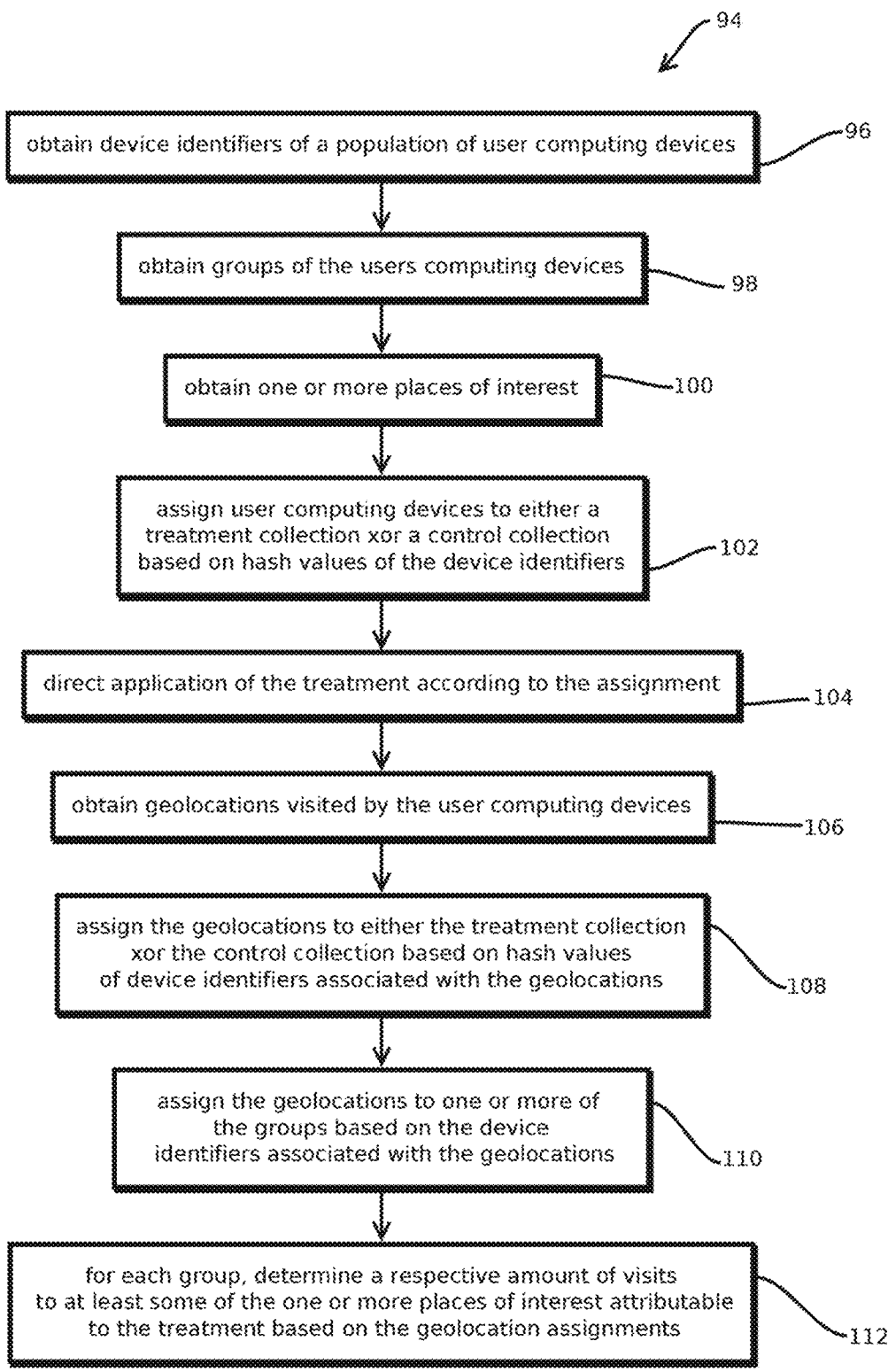
FIG. 4 shows an example of a process for performing geolocation data analytics on multi-group populations of user computing devices consistent with some embodiments of the present techniques.

FIG. 4 illustrates a flow chart of a process 94 for collection assignment and content efficacy measurement. In some embodiments, the process 94 may be executed by the above-described visitation rate module 48 of the geolocation analytics platform 12 of FIG. 1, but embodiments are not limited to that computing environment.

In some embodiments, the process 94 includes obtaining device identifiers of a population of user computing devices, as indicated by block 96. In some cases, the population may be a population from which audiences are identified using the techniques described above, and in some cases, a targeted portion of the population may be defined by specifying a union of those audiences. In some cases, the population is identified from network logs like those described above, and in some cases, records in the network logs may include time-stamped records of communications between individual user computing devices and remote servers, in some cases, including geolocations of the user computing device at the time of the exchange and a device identifier of the user device. In some cases, the network logs come from a variety of different servers, for example, interacting with a variety of different user devices and providing a variety of different services or types of content. In some cases, the network logs are cellular network logs. In some cases, the network logs span some trailing duration of time, for example, a preceding week, a preceding month, a preceding six-month duration, or longer. In some cases, the population may be relatively large, for example, exceeding 1-million user computing devices, and in many cases exceeding 10-million user computing devices, for example, appearing among more than 50 million network log entries indicative of distinct communications over a network, like over the Internet.

Next, some embodiments may obtain groups of the user computing devices, as indicated by block 98. In some embodiments, this process may include executing the above-described processes to identify audiences and receiving a definition of a targeted population in terms of those audiences. For example, an analyst may specify that a targeted population is defined as users either in the intersection of audience A and audience B or in the union of audiences C and D.

Next, some embodiments may obtain one or more places of interest, as indicated by block 100. In some embodiments, the places of interest may be specified in terms of collections of tiles, and in some cases time tiles, for example, tiles overlaying each store location of a given advertiser, or tiles overlaying each geographic area in which a government entity wishes to measure a visitation rate result. In some embodiments, the places of interest are specified as polygons having vertices corresponding to the boundaries of such places. In some embodiments, the number of places of interest may be relatively large, for example, more than 50 places of interest appearing in a metropolitan area, a state, or a country.

Next, some embodiments may assign user computing devices to either a treatment collection or a control collection based on hash values of the device identifiers, as indicated by block 102. In some embodiments, the step may entail performing the techniques described above.

Next, some embodiments may direct application of the treatment according to the assignment, as indicated by block 104. In some cases, step 102 is performed as a batch process for each of the relatively large number of devices, and the results may be stored in a data structure amenable to relatively fast interrogation to determine whether a given device identifier corresponds to a particular collection. In some cases, application of the treatment may include sending content that is being tested to a user computing device. For example, a user may navigate to a particular website or interact with a native mobile application in such a manner that the user's computing device issues a network request for content (e.g., for an ad to be inserted into a publisher's website). In some embodiments, the request for content includes the device identifier and in some cases a timestamp and geolocation of the device.

In some embodiments, the request for content may be received by a third party system (like an ad network, or a bidder in an ad network), and that third-party system may submit a request to the system described with reference to FIG. 1 to determine whether to send the content being tested (such as an ad or instance of advocacy) in response, or if such content should be withheld because the device is in a control collection. In some cases, directing application of the treatment entails making this determination on behalf of another system that then actually sends the content, without actually sending the content with the system that directs application of the treatment. In some cases, this determination is made relatively quickly, for example, subject to the latency constraints described above. In some embodiments, the treatment may be a selection among a set of instances of content, such as among a set of candidate ads being tested, or the treatment may be a single instance of content that is being tested. In some embodiments, step 104 may be ongoing for some duration of time, like a week, a month, or a longer, as an instance of content is tested.

Next, some embodiments may obtain geolocations visited by the user computing device, as indicated by block 106. In some cases, this step may include performance of the techniques described above with reference to block 48 of FIG. 1, including the techniques incorporated by reference. In some cases, the obtained geolocations are obtained from the user computing device, such as a mobile computing device, being carried into a particular store or other place of interest by a user, and the user interacting with the computing device such that the user computing device is caused to issue a request for content, like those described above, including a geolocation and device identifier. In some embodiments, the obtained geolocations may be obtained from an updated network log, which may be the same network log described above or may be a different network log. In some cases, the updated network log spans the duration of time over which step 104 is performed.

In some cases, the geolocations are reported as places visited, or some embodiments may compare the geolocations to the list of places of interest to determine whether the geolocations correspond to visit. In some cases, the geolocations are aggregated as visits, or reported as places visited, where a place visited corresponds to a region in which the user remained within some area for some threshold duration of time. Some embodiments may advance just the visits to subsequent steps.

Next, some embodiments may assign the geolocations to either the treatment collection or the control collection based on hash values of device identifiers associated with those geolocations, as indicated by block 108. In some cases, the step may include determining whether devices engaging in network communications referencing those geolocations have device identifiers belonging in one of these collections. Some embodiments may assign a subset of the geolocations to the various collections by first filtering from the obtain geolocations those that correspond to, e.g., are within, one of the places of interest. For example, some embodiments may determine visits to the places of interest appearing within the obtain geolocations and, then, assign those visits to either the treatment collection or the control collection as indicated. Some embodiments may determine unique visits by maintaining a count of the number of times each device identifier is determined to have visited a one of the places of interest, or any of the places of interest, or both, and reporting a count of those devices with a count greater than or equal to one.

Next, some embodiments may assign the geolocations to one or more of the groups (including the non-targeted portion of the population) based on the device identifiers associated with the geolocations, as indicated by block 110. In some cases, each of the groups may be defined, at least in part, by a set of device identifiers appearing within the respective group, and some embodiments may query each group definition with each device identifier to determine whether the device identifier corresponds to the respective group. Again, the assignment of geolocations may include first filtering geolocations that do not pertain to one or more the places of interest or expressing the geolocations as visits to one of the places of interest and assigning the visits to the groups. In some cases, this step may include calculating a respective place visitation rate for the control and treatment portion of each group.

Next, for each group, some embodiments may determine a respective amount of visits to at least some of the one or more places of interest attributable to the treatment based on the geolocation assignments, as indicated by block 112. In some cases, this step may include making one or more of the lift determinations described above. In some embodiments, results may be reported, for example, as a table to be displayed on an analyst screen, indicating lift due to exposure to the content among those in target segments, lift due to exposure to the content among those who are not targeted, lift due to being in a target segment among those exposed content, lift for those not in the target segments among those exposed to the content, and a measure of an advantage targeted content distribution has over untargeted content distribution.

Figure 5:
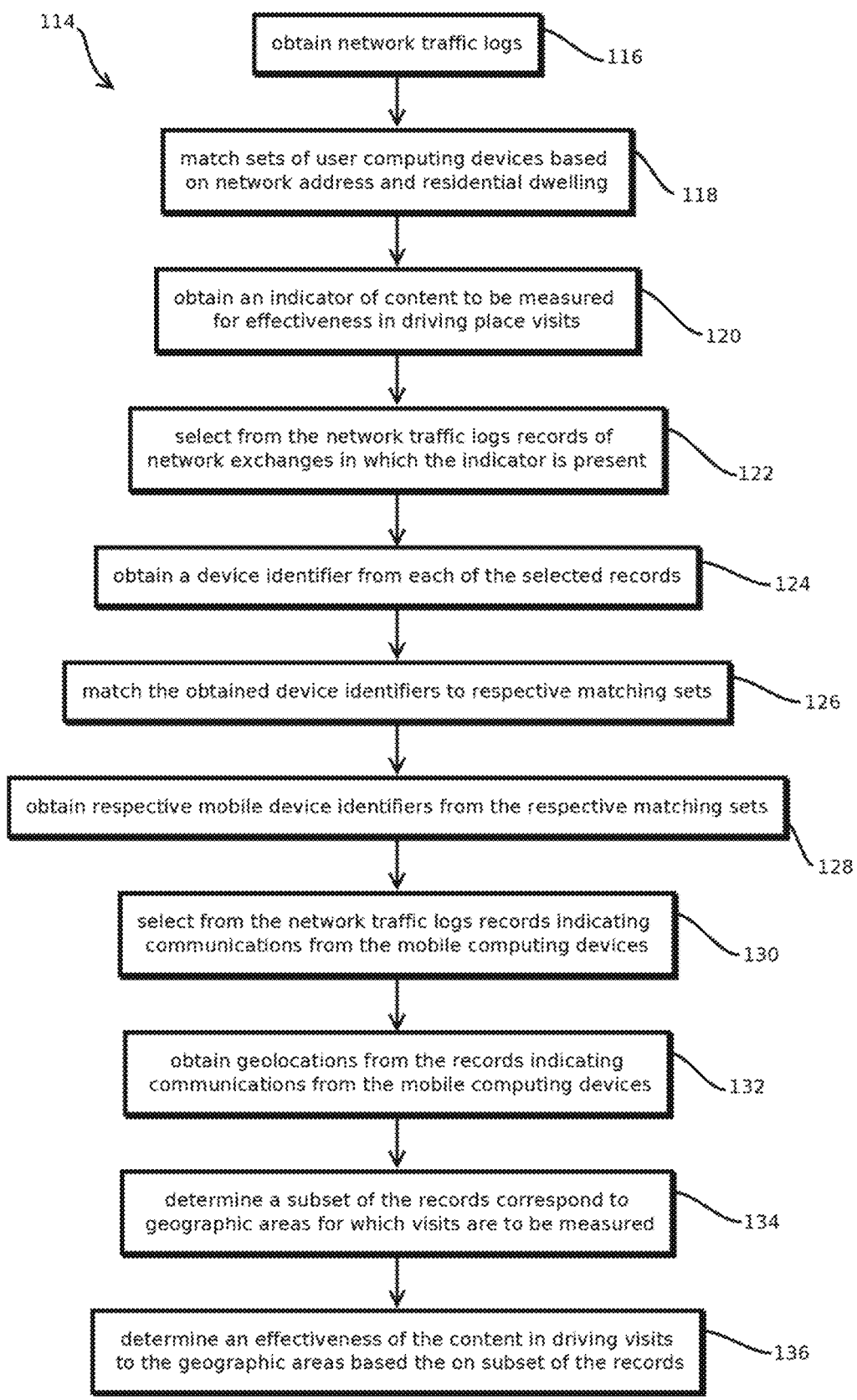
FIG. 5 shows an example of a process for determining the effectiveness of content in driving place visits consistent with some embodiments of the present techniques.

FIG. 5 illustrates an example of a process 114 of probabilistically matching sets of computing devices to individuals and measuring the geographic variations in the effectiveness of content and driving visits based on the matched sets. Process 114 may be used with the above-described techniques, e.g., testing different visit rates relative to different control groups for specific audiences. Or the process 114 may be used fully independently of the techniques above. The process 114, in some embodiments, may be performed by the above-described visitation rate module 48, though embodiments are not limited to that implementation.

In some cases, some of the steps of the process 114 may be implemented in a distributed computing platform described below designed to expedite certain data and time intensive operations. In commercial relevant use cases, the number of network communications being analyzed may number in the billions, and traditional computing devices may not be equipped to complete the analysis in a reasonable amount of time with available computing resources. Some embodiments may device the tasks below and arrange related data in a way that affords faster computation, while doing so with commodity hardware, in a fault tolerant way that accommodates typical failure rates in such hardware.

In some embodiments, the process 114 begins with obtaining network traffic logs, as indicated by block 116. In some cases, the obtained network traffic logs may be collections of those log entries described above, for instance, network traffic logs of web servers or API servers of third parties (e.g., three, five, or ten or more different web publishers or mobile app operators), serving, for example, websites or data for native web applications or mobile applications. In some cases, the network traffic logs may include exchanges with a relatively large number of computing devices via a network, such as the Internet. In some cases, the network traffic logs may span a duration of time exceeding more than one day, more than one week, or more than one month in the past. In some embodiments, the network traffic logs may document communications via network between one or more servers and more than 1000, 10,000, 100,000, and in many commercially relevant use cases, 1 million or 100 million computing devices. In some cases, such communications may be organized in session records, with each session record corresponding to a single computing session between a computing device and a respective server. In some embodiments, each session may document a number of exchanges, such as requests and responses between the remote client computing device and the server. In some embodiments, the exchanges may be documented with a network address of the remote computing device, such as an IP address, or at least a network address through which the remote computing device communicates. In some embodiments, the exchanges may also be documented with user agent strings of the remote computing device, such as user agent fields embedded in hypertext transport protocol requests. In some cases, the user agent string may include fields specifying a browser and browser version executed by the remote computing device, a type of computing device (like a tablet, laptop, desktop, cell phone, or the like), a model of the computing device, a version of an operating system of the remote computing device, a language setting of the remote computing device, an indication of whether the remote computing device is a mobile computing device, and the like. In some embodiments, the user agent string may be embedded in an HTTP request for content sent to the server. In some embodiments, other information may also be included in the request, such as a device identifier implemented by a mobile operating system, like an advertising device identifier or a universal device identifier. In some embodiments, some of the exchanges may also be documented with timestamps indicated when the exchange occurred.

In some embodiments, each of the exchanges or sessions may also be documented in the logs (the plural form is used to refer to a log, singular, and logs, plural) with a geolocation of the client computing device, such as a geolocation sensed with a location sensor of a mobile computing device, like a global positioning system sensor. In some embodiments, a web browser or a native application executing on a mobile computing device carried by the user may query a geolocation framework of the mobile computing device and embed the responsive geolocation in a request or submission to the remote server, and that geolocation may be recorded in the network traffic logs.

The network traffic logs are not necessarily limited to single flat files, and may be encoded in multiple separate files or other data structures that may be joined together to form the information described herein. Further, the network traffic logs need not be labeled as logs to constitute a log. In some cases, some of the information the network traffic logs may be embedded in a flat file, while other information may be encoded in a relational database, and other information is stored in program state, like an attribute of an object in an object oriented programming environment. In some cases, the user computing devices documented in the network traffic logs may correspond to a number of users, with some, and in many cases most, users having multiple computing devices.

In some cases, the information obtained over the network may not explicitly indicate which user corresponds to which device. In many instances, users do not log into a native application, web site, or other identifying framework, like OAuth, and the communications from the client computing device are otherwise anonymous, beyond identifying parameters of the computing device and a network address. Or such parameters are present but obfuscated by third parties.

In some cases, the network communications on the network traffic logs correspond to more than 1000, more than 10,000, and in many commercially relevant use cases more than 1 million or more than 100 million different users, at least some of the users having multiple computing devices reflected in the logs. In some cases, at least 1000, 10,000, or 100,000 of the users have a mobile computing device and a plurality of other computing devices documented in the network traffic logs, in some cases, indicating cross-device experiences between the servers forming the logs and the user's inventory of devices.

Some embodiments may match sets of user computing devices based on network address and residential dwelling, as indicated by block 118. In some cases, each matched set may correspond to an individual user. In some embodiments, each match that may include a unique identifier of the user, such as an anonymized identifier, and a list of one or more, e.g., a plurality, of user computing devices probabilistically inferred to be used by that respective user. In some embodiments, each of at least some of the sets include at least one mobile computing device and at least one non-mobile computing device, like a desktop computer or set-top box (e.g., a cable box, gaming console, smart television, or media streaming device). In some embodiments, the residential dwelling of the respective user may be determined with a process described below with respect to FIG. 6. In some embodiments, the residential dwelling and the sets may be determined primarily or solely based on the network traffic logs, without the user explicitly identifying which devices belong to the user, for instance, without the user logging into the computing device or operating a computing device with a cookie set with a user identifier (for at least some of the records subject to the analysis). In some cases, matched sets may be formed for more than 1000 individuals, such as more than 1 million individuals, in many commercially relevant use cases. Accordingly, matching may be expedited with techniques described below to concurrently perform the matching operation in a distributed fashion on a distributed computing framework.

Matching may be performed based on a variety of criteria, including geolocation, network addresses, and other information, like the information in the user agent strings described above. For example, some embodiments may match user devices based on those user devices sharing the same public IP address in at least some of the network traffic logs. In many cases, local area networks, such as local area networks in an a user's place of employment or in their home, may share a single public facing IP address with a plurality of client devices on the local area network, for instance, using network address translation in a wireless router. In some cases, the wireless router may translate between private IP addresses on the local area network and a single public IP address. As a result, in some embodiments, multiple, different client computing devices may appear to the server to have the same public IP address, and the signal may be used to determine that the multiple devices are used by the same user. In some cases, this technique may not distinguish between the various local area networks to which a user may connect to communicate with a server, for instance, between a user's work, home, and a coffee shop wireless area network. Accordingly, some embodiments may use a variety of other signals to refine the selection, as often some of the measurements described herein are measured according to effectiveness based on residential patterns.

Figure 6:
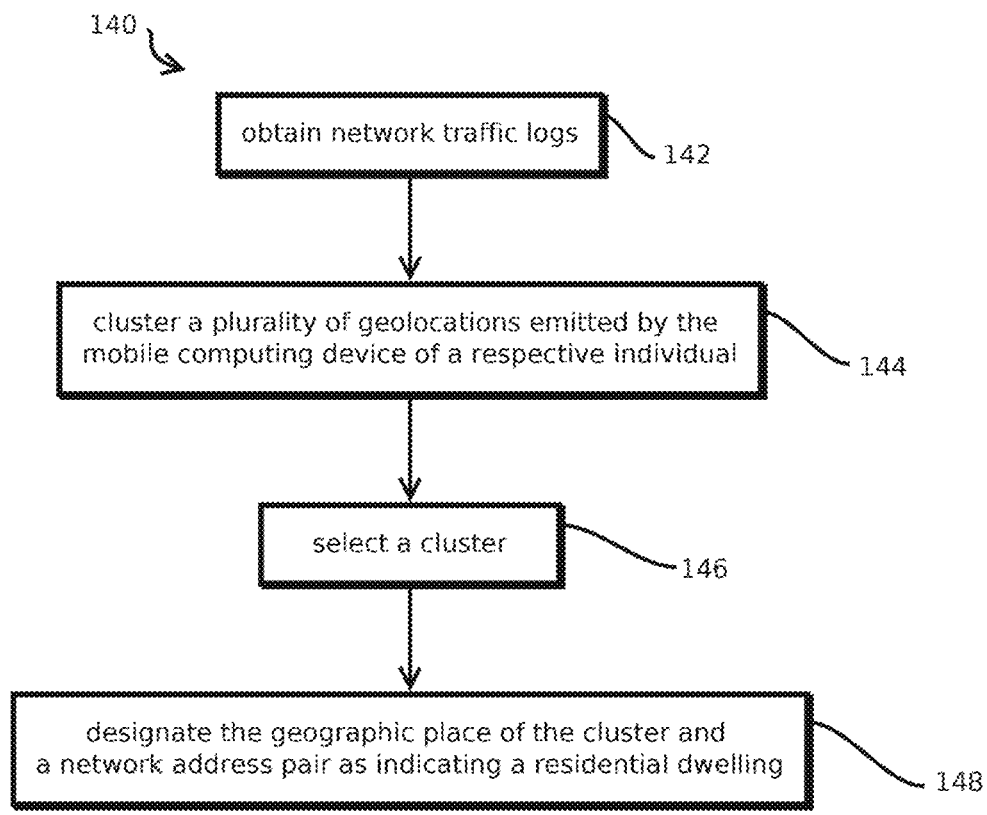
FIG. 6 shows an example of a process for determining residential dwellings based on network signals consistent with some embodiments of the present techniques.

Accordingly, some embodiments may match sets of user computing devices as belonging to the same user based both on those user computing devices sharing a public IP address in at least some of the communications and the network traffic logs and based on those computing devices reporting a geolocation corresponding to a residential dwelling determined with the process of FIG. 6. In some cases, a mobile device operating on the network at home, like a smart phone, may report a geolocation of the smart phone via the public IP address of the local area network. In these use cases, a desktop computer may also access the server via the local area network, using the same IP address, as a result, the geolocation sensed by the mobile computing device may be used to designate the local area network is corresponding to a residential dwelling local area network, and the different computing devices may be matched to one another in virtue of the computing devices sharing a public IP address, thereby also geolocating the desktop computer.

In some cases, the quality of matches may be strengthened with additional signals. For example, some embodiments may calculate a matching score in a pairwise match between each of a set of computing devices using the same public IP address in at least some network communications. In some embodiments, the weightings may be adjusted by manually sampling a subset of the computing devices and manually investigating whether the scores are correct (e.g., with surveys, or reconciling expected patterns with exogenous data sets). In some embodiments, the match may be based on at least two of these parameters, at least three of these parameters, or five or more of these parameters. In some embodiments, the parameters may be converted into vectors in a device descriptor space, and devices may be matched based on a Euclidean distance between the vectors, e.g., by clustering within the space.

Next, some embodiments may store data associating the matching devices in a respective matching set having an identifier of the individual. In some cases, the sets may be stored with an index having an index key corresponding to a mobile device identifier, such that subsequent requests from the mobile device or communications from mobile device can serve as an entry point into the respective set of the individual.

In some embodiments, the matching operation may be expedited with a distributed data storage and analysis framework, such as Apache Hadoop. In some embodiments, more than 5, 10, or 50 different computing devices may execute one or more, for instance three or more processes, each process corresponding to a node in a distributed compute cluster. In some embodiments, different nodes may serve various roles for coordinating and executing the operations of the compute cluster. In some embodiments, a name node may have a master node and a job tracker that cooperate to coordinate (e.g., assign tasks and data to) operations among a relatively large number of slave nodes, each slave node having a task tracker, a data node and logic to execute various map and reduce operations concurrently to perform the matching operation. For example, some embodiments may map subsets of the network traffic logs to the different slave nodes, and instruct those slave nodes to generate a hash table by IP address that groups device communications corresponding to a public IP address. Some embodiments may then instruct the various slave nodes to reduce out those groupings by consolidating according to the values to which the hash bends were stored. Collisions may indicate likely shared IP addresses, and subsequent distributed operations (e.g., distributed by mapping ranges of hash values to slave nodes) may distinguish among different IP addresses the hashed the same value. In some embodiments, the data operates upon may be stored in a distributed file system, such as the Hadoop distributed file system. In some cases, the file system may replicate data on multiple computing devices, such that the failure of an individual one of the computing devices is not fatal to an analysis.

In another example, the Apache Spark framework may be implemented to concurrently perform the operations described above. In some cases, Spark may be faster than Hadoop when sufficient memory is available, e.g., by reducing the amount of storage access operations. For example, a compute cluster of similar scale may execute a driver program, a cluster manager, and a relatively large number of worker notes that perform the operations at the direction of the driver program and cluster manager. In some embodiments, an executor within the worker node may perform various tasks and operate on cache-stored within the worker nodes. In some cases, data may be stored in redundant records on multiple computing devices, for example, in resilient distributed data sets, which may include read only multi-sets of data items that are distributed over the cluster.

Next, some embodiments may obtain an indicator of content to be measured for effectiveness in driving place visit, as indicated by block 120. In some cases, the indicator is an identifier of the content, such as a file name of the content or unique identifier in the content distribution system. In some embodiments, the content is an advertisement, for example, sent for insertion in a webpage or native application in response to an ad request on an ad auction network. In other examples, the content may be literature, such as flyers, mailed to a mailing address of an individual, like their residential dwelling. In other examples, the content may be an advertisement for television or radio for broadcast within a geographic area or a newspaper advertisement targeted to an area, such as an area overlapping a certain set of dwellings.

Next, some embodiments may select from the network traffic logs records of exchanges in which the indicator is present, as indicated by block 122. This step may be omitted in some embodiments in which the content is broadcast content, which is not to suggest that other steps may not also be omitted in some use cases. In some embodiments, the network traffic logs may document requests or responses, such as identifiers of content sent over the network and the device to which the content was sent. In some embodiments, the selection may be performed with the above-described distributed computing frameworks, for example, by segmenting the network traffic logs among the different computing devices and nodes and requesting the nodes to respond with entries corresponding to the content. In some embodiments, the content may be sent to a relatively large number of users, corresponding to a relatively large number of transactions in the logs. For example, the content may be sent to more than 1000, more than 10,000, and in many commercially relevant use cases, more than 100,000, or more than 1 million different user computing devices corresponding to similar or the same number of users.

Next, some embodiments may obtain a device identifier from each of the selected records, as indicated by block 124, indicating the device to which the content was sent. In some embodiments, the obtained device identifier is a probabilistic identifier, such as a set of the type of data described above by which the matches were performed, like a network address, user agent string, and geolocation and timestamp. Thus, in some cases, the device is not uniquely identified in the network log records, and several exchanges with different devices may have some of the same parameter values or all of the same parameter values. Or in other cases, the device identifiers and explicit identifier, like a UDID or ADID, or website login credentials.

Next, some embodiments may match the obtained device identifiers to respective matching sets obtained in step 118, as indicated by block 126. In some embodiments, the match of obtained device identifiers may be performed by accessing the matching sets via the index described above. In some embodiments, the match may map each obtain device identifier to which content was sent to a set of other computing devices associated with the respective individual to which the content is inferred to have been sent. In some cases, the match is explicit, e.g., between an explicit (unique) device identifier in the network log and in the set. Or in some cases, the match is probabilistic, e.g., based on the same techniques by which the above described matches are executed.

Next, some embodiments may obtain respective mobile device identifiers from the respective matching sets, as indicated by block 128. In some embodiments, an individual may be associated with multiple mobile device identifiers, in which case multiple devices may be returned. Devices may be determined to be mobile devices, based on the user agent strings, or based on the type of application through which content is requested, for instance, via a native app, or based on probabilistic inferences, such as a greater than a threshold diversity or frequency of change in IP address or geolocation.

Next, some embodiments may select from the network traffic logs records indicating communications from the mobile devices, as indicated by block 130. In some cases, the content may be sent to a different device from the mobile computing devices. For example, content may be sent to a desktop computer or set-top box in a user's home, and the same user may later operate their mobile computing device to communicate with the same set of servers. In some embodiments, the selection operation may be expedited with the above-described distributed computing frameworks. In some embodiments, the selection operation may performed sometime after the content was sent, for example, more than an hour, more than a day, more than a week, or more than a month to accumulate statistically significant amounts of data for relatively fine-grained geographical analyses.

Next, some embodiments may obtain geolocations from the records indicating communications from the mobile computing devices, as indicated by block 132. In some embodiments, the obtain geolocations may be identifiers of places visited by the mobile computing devices, for instance, obtained by querying a places visited API of a geolocation framework executing on the mobile device, or in some cases, the obtained geolocations may be obtained in the form of timestamped latitude and longitude coordinates or tile identifiers, such as those described above.

Next, some embodiments may determine a subset of the records that correspond to geographic areas for which visits are to be measured, as indicated by block 134. In some embodiments, those distributing content may be interested in response rates in particular geographic areas, for instance, in understanding how response rate varies in different zip codes, square kilometers, cities, states, countries, or the like. Further, in some embodiments, those distributing content may be interested in how those response rates map to (and vary among) various places that a user may visit, such as each store within a chain, or each store in which a brand is distributed. Between these two sets of geographic areas (i.e., areas to which content is distributed, and places where visits are measured), a matrix of visitation rate may be determined, with rows corresponding to places visited, and columns corresponding to places to which content was distributed, or vice versa. Thus, some embodiments may include receiving from the user a set of geographic places where visits are to be measured.

In some embodiments, the places where visits are to be measured may be brick-and-mortar retail stores defined by a bounding polygon. In some embodiments, performing a point in polygon determination for each of several million or several hundred million different geolocations responsive to step 130 and 132 may be too computationally intensive and time-consuming for available computing resources. To further expedite operations, some embodiments may perform intermediate computations on the set of places to be measured to expedite this determination. For example, some embodiments may identify a set of tiles within or overlapping a polygon corresponding to each place, forming an index that maps polygon identifiers to sets of overlapped tiles, and some embodiments may then determine whether the geolocations obtained in step 132 fall within the responsive tiles. In some embodiments, the tiles may be square tiles uniquely identified by a latitude and longitude specifying the tile area, and a geolocation may be determined to be within one of the tiles by truncating a set of most significant digits of latitude and longitude coordinates, thereby transforming the latitude and longitude coordinates into a unique identifier of a square tile, such as 100 m² tile. Embodiments may then determine whether the truncated geolocation coordinates are also the name of a tile previously determined to overlap or fall within one of the polygons of one of the user supplied places for which visits are to be measured, e.g., by determining whether the tile is in the aforementioned index and retrieving the corresponding polygon. Or some embodiments may perform a point in polygon analysis.

Next, some embodiments may determine an effectiveness of the content in driving visits to the geographic areas based on the subset of records, as indicated by block 136. In some embodiments, the step may include performing the techniques described in U.S. patent application Ser. No. 13/769,736, as incorporated by reference above. In some embodiments, as noted, an analyst may be interested in how visitation rates vary according to the geographic area to which the content was sent. For example, certain content may yield stronger responses in certain neighborhoods or cities. Accordingly, in some embodiments, an analyst may supply a list of places, such as bounding polygons, zip codes, sets of tiles, or place names, for which the effectiveness of content is to be measured. Some embodiments may separate the content distribution instances from step 122 into different bins, each bin corresponding to one of the content areas for analysis. In some cases, the binning may be based on a geolocation to which the content was sent, or in some cases, the binning may be based on a geolocation of a residential dwelling associated with a computing device to which the content was sent.

In each of these bins, some embodiments may then determine a visitation rate (e.g., a lift) for each of the geographic areas for which visits are to be measured, thereby determining a matrix of visitation rates. In some embodiments, a heat map may be generated and sent for display to an analyst's computing device, with the heat map indicating for each visit destination where content responses are strongest, or for each content distribution place, a heat map may be generated and sent indicating where people tend to visit after viewing the content. In some embodiments, the visitation rate may be determined by dividing the number of people who receive content into the number of people who visited a place, as indicated by their mobile computing device being carried by them into the place, and the mobile computing device reporting back a geolocation indicative of the visit. In some cases, changes in such rates over time may be determined, or some embodiments may determine differences in such rates between those who received the content and those that did not (e.g., with the control group selection technique discussed above) (each of these differentials also constituting a type of place visitation rate). In some embodiments, these determinations may be made for each of several different content items and rates may be determined on an audience by audience bases, thereby forming a four dimensional matrix, with the other two of the dimensions being areas where the content was sent and places visited.

FIG. 6 illustrates an example of a process 140 of determining a residential dwelling geolocation of a respective individual based on network traffic logs (e.g., server logs). In some embodiments, the illustrated process 140 may include obtaining network traffic logs, as indicated by block 142, such as the network traffic logs described above.

Next, some embodiments may cluster a plurality of geolocations emitted by the mobile computing devices of a respective individual, as indicated by block 144, such as the geolocation stored in the network traffic logs, as noted above. In some embodiments, clustering may be clustering based on both geolocation and time, for example, in a four dimensional space. In some embodiments, clustering may be a density-based clustering using the techniques described above in which core locations and connected locations are determined.

In some embodiments, clustering may produce a plurality of candidate clusters, and some embodiments may select among these candidate clusters to determine a residential dwelling, as indicated by block 146. In some embodiments, the candidate clusters may be selected among based on attributes of tiles overlapping those clusters. In some embodiments, clusters may be selected based on residential activity scores, like residential attributes of those tiles, for example, by averaging such scores for the respective clusters (e.g., over time), such as time tile scores corresponding the time and place of the clusters, or by selecting a nighttime score for a time tile. In some embodiments, a highest scoring cluster for residential activity may be selected. In some embodiments, the clusters may be selected among based on a time of the cluster. For example, some embodiments may select a cluster having a measure of central tendency of time (e.g. mean median or mode) that is closest to midnight local time, as often occurs when most people are sleeping home.

Next, some embodiments may designate the geographic place of the selected cluster and a network address pair as indicating a residential dwelling, as indicated by block 148. In many cases, clusters are large enough, or reported geo-locations are low enough resolution, that a relatively large number of residential dwellings fall within a single designated geographic place, like a tile described above, or a polygon encompassing a multi-family dwelling. To distinguish between these distinct residential dwellings within the same placed designation, some embodiments may use a pairing of public IP address, such as a public IP address of a shared router of a home network, and the designation of place to uniquely identify residential dwellings where multiple such dwellings occur within a single identifier of a geographic place.

Figure 7:
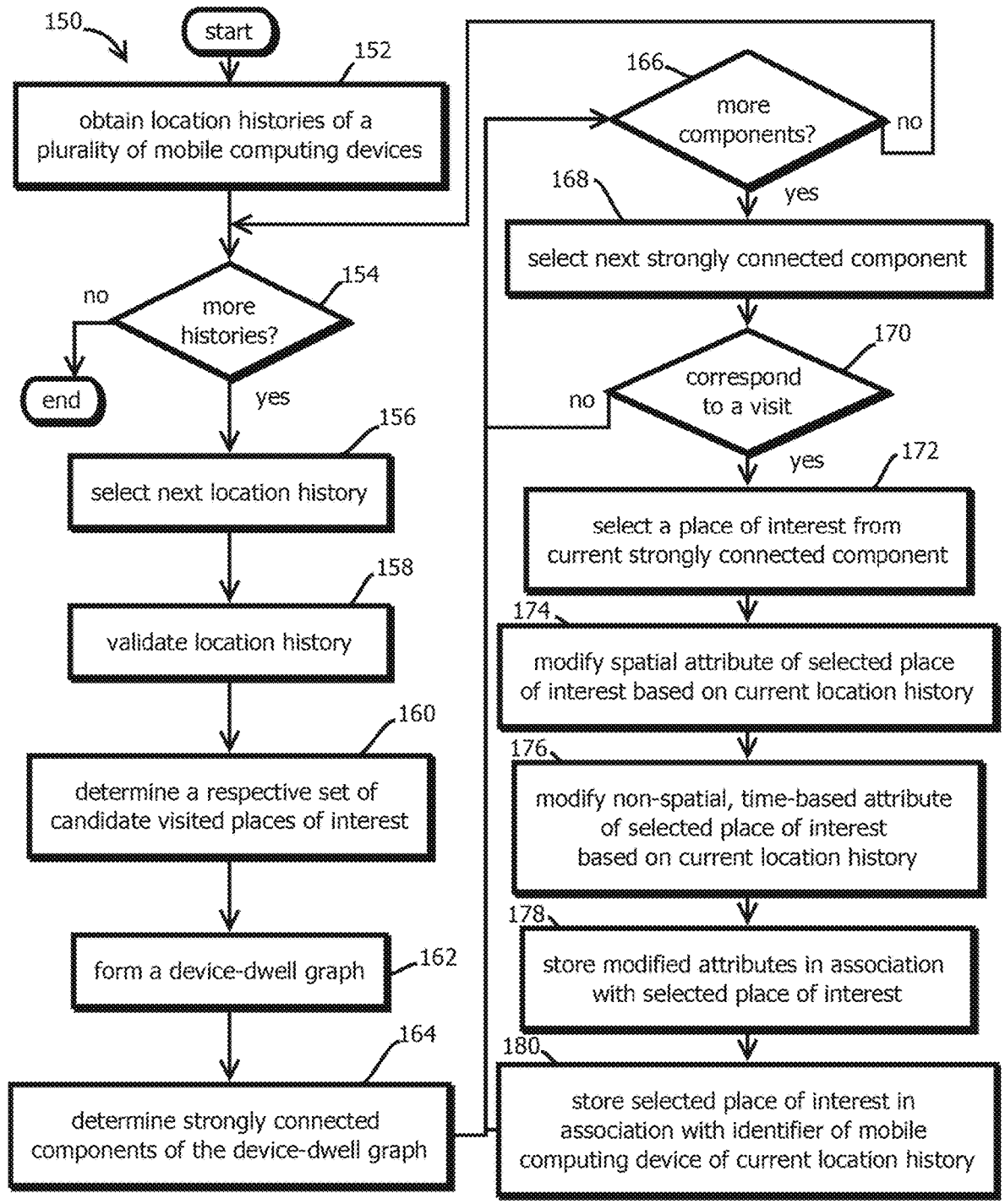
FIG. 7 is a flowchart that shows an example of a process by which a device-dwell graph may be formed and interrogated to infer visited places in accordance with some embodiments of the present techniques.

FIG. 7 shows an example of a process 150 by which the above-described techniques for inferring dwell locations based on a device-dwell graph may be implemented. In some embodiments, the process 150 may be executed by the above-described user profiler module 56 of the geolocation analytics platform 12 of FIG. 1, though embodiments are not limited to that implementation, which is not to suggest that any other description is limiting. In some embodiments, the process 150 may be executed independently of the operations described above with reference to FIGS. 1 through 6 or in conjunction with those operations synergistically (e.g., audiences may be inferred based on places visited), again which is not to suggest that any other description is limiting.

In some embodiments, the process 150 may be executed periodically, for instance as a batch process executed hourly, daily, weekly, monthly, or more or less often. In some embodiments, the data processed by process 150 may accumulate between batch processes and may span the duration of time between batches and in some cases prior to the batch processes. In some embodiments, the batch process may augment existing data structures operated on in the process 150, for example, updating user profiles, device-dwell graphs, and attributes of places, or in some cases the process 150 may create new records in the course of executing the process 150 (both of which are consistent with terms like "generating" and "forming" used in reference to those data structures). In some embodiments, the process 150 may be executed in real-time, as data is acquired from a mobile computing device about its geolocation, for instance, with a complex event processing implementation leveraging tools like Apache Flink™ or Apache Spark™ to process relatively large inflows of mobile device geolocation data with relatively low latency. Thus, in some cases, the process 150 may be initiated responsive to an event, for instance, receiving an updated geolocation of a mobile computing device, or the process 150 may be initiated responsive to an application program interface request or some duration of time elapsing between batch processing instances.

In some embodiments, the process 150 includes obtaining location histories of a plurality of mobile computing devices, as indicated by block 152. In some embodiments, the location histories may be the above-described geolocation histories. In some embodiments, the location histories may include a plurality of timestamped geolocations spanning some duration of time and associated with the mobile computing device from which they were obtained (e.g., with one of the device identifiers described above). In some embodiments, the obtained geolocation histories may span a duration of time of more than one minute, more than one hour, more than one week, more than one month, or more than one year for a given or average mobile computing device in a population of such devices. In some embodiments, the location histories are location histories of users associated with a plurality of computing devices in above describe user profiles, and network communications by the different computing devices may be attributed to a single user and be indicative of changes of location history of that user, an arrangement consistent with use of the term mobile computing device geolocation history or location history. In some embodiments, the location history of a given device is obtained responsive to receiving an event indicative of a current geolocation of the given computing device, for instance, from an ad request that causes a geolocation history spanning previous network communications to be retrieved from memory. In some embodiments, geolocation histories for more than 10,000, 100,000, 1 million, 10 million, or 100 million mobile computing devices or users may be obtained, in some cases in a single query during a batch process, or in some cases over multiple instances of the process 150, for instance, responsive to geolocation events over a day, week, month, or year.

Some embodiments of the process 150 may execute a routine described below with reference to a loop beginning with decision block 154. In some embodiments, location histories may be processed sequentially, for instance, in a single process, or some embodiments may execute the operations in this loop concurrently for different location histories, for example, with distributed processing frameworks like Hadoop™ or other MapReduce implementations like those described above. In some embodiments, location histories may be mapped to different processes, in some cases with different processes executing on different computing devices, and those computing devices may return a subset of the operations in the process 150. Some embodiments may then assign reducing tasks to computing devices by which the result of the mapping operations are reduced into, for example, selections of places of interest as described below. Or some embodiments may break up these operations into multiple mapping and reducing steps.

In some embodiments, the process 150 includes determining whether there are more geolocation histories to process, as indicated by block 154. Upon determining that there are no more location histories to process, in some cases, the process may terminate or may return to continue waiting for an event that causes a new instance of the process 150 to be executed. Alternatively, upon determining that there are more location histories to process, some embodiments may select a next unprocessed location history from among those that were obtained to process, as indicated by block 156. Some embodiments may then validate geolocations reported within the geolocation history, as indicated by block 158, for instance by implementing the techniques described above by which falsified reported geolocations may be detected and filtered.

Some embodiments may then determine a respective set of candidate visited places of interest within the location history, as indicated by block 160. In some cases, this may include determining a respective set of candidate places of interest for a subset of geolocations in the location history, for instance, a subset designated as having not yet been processed by process 150 in memory. In some embodiments, the operation 160 may include querying a GIS for places of interest that overlap geolocations in the location history. In some cases, the query may be sent to the above-described GIS of FIG. 1 and may include, for example, respective latitude and longitude coordinates of the geolocations. Some embodiments may send a query for each geolocation in the location history or each geolocation that is not yet processed by process 150. Thus, some embodiments may, for example, form five different queries for five different timestamped geolocations sequentially reported by the mobile computing device and receive five different sets of responsive places of interest to those queries. The query responses may be stored in memory in association with the geolocation record in the location history for subsequent processing.

In some embodiments, the geolocations in the location history have relatively limited accuracy in virtue of the way in which geolocation is determined. In some embodiments, a given geolocation may indicate the actual geolocation of the mobile computing device within some geographic area, such as within some radius of the nominal geolocation reported with some probability. For example, a given latitude and longitude measured with a given type of geolocation measurement technique may indicate with greater than 20%, 50%, 80%, or 95% probability that the mobile computing device is within 10 m, 30 m, 50 m, 80 m, or 100 m (in any permutation of these probabilities and distances depending upon the type of measurement technique) of the given latitude and longitude. In some embodiments, the confidence area is a radius, or in some cases the confidence area has a noncircular shape. For example, some embodiments may store in memory a mapping of errors associated with the given type of geographic location measurement to geolocation. In some embodiments, this mapping may specify a topographic surface that indicates that in some areas errors tend to be larger while in other areas errors tend to be smaller, and some embodiments may calculate a noncircular confidence area based on the values of the surface proximate to the nominal geolocation reported by the mobile computing device. In some embodiments, the surface is an inverse of the historically measured or modeled error, and some embodiments determine a confidence area by intersecting an inverted circular cone with the error surface, with the inverted cone being centered over the nominal reported geolocation of the mobile computing device. As a result, the confidence area is expected to extend further from the geolocation reported by the mobile computing device in directions in which signals are less reliable and remain closer to the geolocation reported by the mobile computing device in directions in which signals are more reliable. Or some embodiments may apply some other convolution function centered on the nominal reported geolocation to this surface to determine a perimeter of a confidence area. Some embodiments may determine the confidence area with a ray-casting algorithm that determines a distance traveled until an integral of the inverse of error along the ray satisfies a threshold.

In some embodiments, the confidence area is reported as a three dimensional surface, such as a Gaussian surface in which latitude and longitude form two dimensions of the surface and probability of being at a given latitude and longitude forms a third orthogonal dimension. Thus, in some cases the confidence area is a conditional probability of the mobile computing device being at a given geolocation given that the mobile computing device reported the geolocation in the geolocation history based on wireless signals received by the mobile computing device. In some embodiments, sequential measurements of geolocation by the mobile computing device are combined to reduce the amount of uncertainty and shrink the confidence area and elevate the probabilities, for instance with the above-described Kalman-filter-based techniques. In some cases, sequential measurements are combined with inertial measurement unit readings of the mobile computing device to further reduce area (e.g., by calculating an average of a subsequent reported geolocation and the sum of a prior reported geolocation and an integral of such IMU readings between the geolocation measurements).

In some embodiments, the confidence area, such as its radius, or parameters of a convolution applied to one of the above-described three-dimensional error surfaces, may be determined based on a type of geolocation measurement that resulted in a given geolocation in the location history. For example, cell tower triangulation may have a relatively large confidence area, while identifiers from wireless transmitters and local area networks, like Bluetooth beacons or SSID values in beacons in Wi-Fi networks may have a smaller confidence area. In some cases satellite navigation system measurements of geolocation, such as GPS measurements are GLONASS measurements, may have an even smaller confidence area. In some cases, timing signals in WiFi beacons may be used to determine geolocation relatively accurately based on a time of flight from an access point or set of access points. In some embodiments, the confidence area or parameter upon which the confidence areas are determined may be reported by the mobile computing device in association with the geolocation, for example, a count of a number of satellites upon which a GPS measurement is based may indicate an amount of potential error in the measurement. Geolocations reported by the mobile computing devices may be sent in association with a value that identifies the type of measurement in some cases.

In some embodiments, the geographic information system is queried with the confidence area (which in some cases may be a region of a confidence area 3D surface above a threshold value) to identify places of interest that overlap the confidence area for a given reported geolocation in the location history. Thus, in some cases, and in many cases quite often, a given reported geolocation of the mobile computing device in the location history may overlap multiple places of interest, making that geolocation in the location history ambiguous as to which place of interest is actually being visited.

In some cases, the places of interest are specified by polygons having vertices corresponding to, such as expressed as, latitude and longitude coordinates. In some cases, the places of interest are associated with attributes, such as classifications in a hierarchical taxonomy of types of places of interest (e.g. one classification through such a taxonomy may include the following hierarchy of classifications: businesses, restaurants, Italian restaurants, pizza places, deep dish pizza places). In some cases, the places of interest are associated with scores that indicate a degree to which the attribute applies, such as a binary value indicating whether the attribute applies at all, or a score from 0 to 7 indicating a strength with which the respective attribute is expressed at the place of interest.

Some embodiments may expedite such queries with the above-described tiles. For example, some embodiments may pre-calculate an index that maps tile identifiers to places of interest that overlap those tiles. Some embodiments may determine which tiles overlap a confidence area and then access the entries for those tiles in the index to obtain a set of places of interest that are potential responses to a confidence area query. In some cases, tile identifiers are based on (e.g., expressed as) a concatenation of latitude and longitude for a center point of the tile, which may expedite operations of some embodiments to identify which tiles are in the confidence area. Some embodiments may then determine overlap between the confidence area and the set of potential places of interest, thereby avoiding a relatively computationally expensive operation in which a given confidence area is compared against every place of interest stored in the geographic information system, which in some cases may exceed 10,000, 100,000, 1 million, or 10 million places of interest. In some cases, overlap may be detected with a polygon collision algorithm, which in some cases, may be expedited by limiting polygons to convex polygons (and representing some places of interest that would otherwise be concave as a set of two or more convex polygons that approximate that concave shape).

In some embodiments, the queries may further indicate an amount of overlap, and in some cases an integral of a probability surface of a confidence area over the amount of overlap of a place of interest, as a overlap score for each responsive place of interest. Thus, if a given confidence area is largely within a first place of interest, but a small peripheral portion overlaps a second place of interest, the first place of interest may have a higher score than the second place of interest in the query response. In some embodiments, these scores may serve as weights in edges of a device 12 graph described below, and some cases, as weights in directed edges pointing towards a node corresponding to a place of interest for which a given score applies, or in some cases as attributes of undirected edges, with the attributes indicating to which of the two nodes a given score pertains. Thus, edge X may have attribute Y indicating a first attached node has a first amount of overlap and attribute Z indicating a second attached node has a second amount of overlap. Or some embodiments may make a binary determination of whether there is any overlap at all, whether there is more than a threshold amount of overlap, or whether there is more than a threshold integral of a probability surface over and overlap, and designate places of interest that satisfy one or more of these determinations as responsive to a query. Overlap scores for a given edge may accumulate (e.g., as a sum) or be reflected in a measure of central tendency (e.g., a mean, mode, or median) across multiple geolocations that implicate the given edge.

Thus, a given geolocation in a location history having a confidence area may result in a query that returns two, three, four, five, or 10 or more places of interest at which the mobile computing device may be disposed given the geolocation reported by the mobile computing device. And a location history having a plurality of such geolocations may produce a ordered list of sequential sets of such places of interest responsive to each geolocation reported over time by the mobile computing device.

With these sets of candidate places of interest overlapping the geolocations or confidence areas of those geolocations, some embodiments may form a device-dwell graph, as indicated by block 162. In some embodiments, the device-dwell graph may have nodes corresponding to the candidate places of interest and edges indicating which candidate places of interest were responsive to the same reported geolocation or confidence area in a query. As noted above, in some cases the edges have attributes that indicate respective probabilities of pairs of nodes connected by the respective edges being a place of interest at which the mobile computing device is or was disposed. Some embodiments may prune the device-dwell graph to remove those edges in which one or both of such probabilities are less than a threshold.

It should be emphasized that a data structure need not be labeled in program code as a graph to constitute a graph for the present purposes, as long as that data structure encodes the relationships between values described herein. For example, a graph may be encoded as a matrix, keyvalue pairs, or one or more objects in an object-oriented programming environment. In some embodiments, the graph may be stored in a graph database, such as Neo4J™ (or other database having index-free adjacency), or the graph may be maintained in one of these other encodings, either committed to persistent storage or maintained in system memory for relatively fast access. In some cases, the graph may be a distributed data structure that spans multiple computing devices, for example, as records and instance of the Hadoop File System (HDFS).

Next, some embodiments may determine strongly connected components of the device-dwell graph, as indicated by block 164. Strongly connected components are sub-graphs of the device-dwell graph having a plurality of nodes in which every node in the sub-graph is reachable via edges of the sub-graph from every other node in the sub-graph. (In some cases, the device-dwell graph itself is not strongly connected.) In some cases, the strongly connected components may be determined by initializing a list of nodes of the graph with associated respective flags to indicate whether the respective node has been "visited" by a recursive search routine. Some embodiments may repeatedly, until all of the nodes in the list have been designated as having been visited, select a next node in the list that is not yet been visited. Upon selecting the next node in the list that is not yet been visited, some embodiments may update a list of strongly connected components to include an identifier of a new strongly connected component that includes the newly selected node. Some embodiments may then call the recursive search routine with that selected node as a parameter designating the selected node as a current node.

In some cases, the recursive search routine may receive a current node as a parameter when called. The recursive search routine may then designate the current node as having been visited in the list by flipping a flag of the current node in the list. The recursive search routine may then identify every edge of the current node in the device-dwell graph, determine which of the edges connect to nodes that have not yet been visited in the list, and then call itself with those nodes that have not yet been visited as parameters of the recursive search routine. In each recursion, the recursive search routine may further add the visited nodes reached with the recursive search routine to the current newly created strongly connected component as a set of nodes that are members of that strongly connected component. These recursive operations may repeat until every node that is part of a strongly connected component has been visited and added to the current strongly connected component, at which point that strongly connected component may have been fully explored, and embodiments may return to the list, as described above to identify another strongly connected component.

Or in some embodiments, the device-dwell graph may be a directed graph, and some embodiments may determine strongly connected components with Kosaraju's algorithm, Tarj an's strongly connected components algorithm, or the path-based strong component algorithm.

Some embodiments may filter strongly connected components having only a single node from the resulting set of strongly connected components to leave only those having a plurality of nodes, or some embodiments may carry through strongly connected components only having a single node for purposes of the process 150.

Some embodiments may then perform a routine described below on each of the strongly connected components. Again, the techniques described above for implementing concurrent operations to expedite processing may be applied here, for instance, by assigning different strongly connected components to different processes on the same or different computing devices to facilitate concurrent, and expedited, operations. Or some embodiments may iterate through each of the strongly connected components serially in a single process, or serial and concurrent operations may be combined, for instance, with a plurality of processes working serially through lists concurrently relative to one another.

Some embodiments may determine whether there are more strongly connected components to process, as indicated by block 166. Upon determining that there are no more strongly connected components to process, some embodiments may return to block 154 and determine whether there are more location histories to process. Alternatively, upon determining that there are more strongly connected components to process, some embodiments may proceed to the next operation, and some embodiments may select a next strongly connected component, as indicated by block 168.

Some embodiments may determine whether the currently selected strongly connected component corresponds to a visit of the mobile computing device to at least some place, such as a place of interest, as indicated by block 170. In some embodiments, this determination may include classifying a corresponding strongly connected component as representing a device dwell based on: an amount of time-stamped geolocations corresponding to the respective strongly connected component, an amount of time between at least some time stamps of the corresponding time-stamped geolocations, and an amount of time spanned by corresponding time-stamped geolocations less than a threshold amount of time apart and in a sequence that is not interrupted by more than a threshold amount of time-stamped geolocations in the location history that do not correspond to the respective strongly connected component. Upon determining that the strongly connected component currently selected does not correspond to a visit, some embodiments may return to block 166 to determine whether there are more components to process.

Alternatively, upon determining that the strongly connected component currently selected does correspond to a visit, some embodiments may select a place of interest from the current strongly connected component as a place of interest that was likely (for instance, most likely relative to others in the strongly connected component, or having a greater than a threshold probability) visited by the mobile computing device at the time the geolocations in the location history that caused the queries that returned the places of interest corresponding to nodes in the strongly connected component were measured by the mobile computing device. In some cases, the strongly connected component may correspond to a set of candidate places of interest potentially visited by a user, but uncertainty in reported geolocations from mobile computing devices may make it difficult to distinguish which of the places of interest was actually visited. Some embodiments may make an aggregate decision across the strongly connected component to identify which of those places of interest was likely visited (or most likely visited) in a manger that constitutes a dwell, or whether multiple places of interest, such as a subset of nodes in the strongly connected component were the actual subject of such visits.

In some embodiments, a visit score may be calculated for each node of the strongly connected component, and those nodes in strongly connected components having higher than a threshold visit score may be selected. Or embodiments may select a node in the strongly connected component having a highest visit score among the nodes of the strongly connected component. In some cases, the visit score is based on the above-described attributes of edges that indicate, as between (or for) a respective pair of nodes, the relative or absolute probability that the mobile computing device was at the place of interest when a geolocation in a confidence area of that geolocation was determined for one of the above-described queries. Some embodiments may sum the scores corresponding to each place of interest on each of the edges connected to the place of interest's node in the strongly connected component, and the resulting sum may serve as a visit score. Or embodiments may determine a measure of central tendency of these values for each node.

Some embodiments may update the geographic information system based on the location history. For example, some embodiments may modify spatial attributes of the selected place of interest based on the current location history, as indicated by block 174. In some cases, this may include determining that the bounding polygon for the geographic place of interest needs to be adjusted due to a relatively large number of geolocations in the location history leading to the selection of block 172 while being relatively close to but outside of the bounding polygon for the selected place of interest. In some embodiments, modifying may include flagging the place of interest for human review or adjusting one or more vertices of the place of interest to be some increment, like 10% or 20%, closer to the geolocation's outside the place of interest that led to the selection. Similar adjustments may be made where geolocations never fall outside the place of interest or near its perimeter to reduce the size of the place of interest bounding polygon. Over time, such adjustments are expected to gradually update the polygon for the place of interest, while remaining robust to outlier geolocations. Some embodiments may add the geolocations attributed to a place of interest to a set of such geolocations from previous selections for other mobile computing devices. Some embodiments may then calculate a convex hull of a density-based cluster of these data points, e.g., determined with DB-SCAN, and that convex hull may serve as an updated polygon for the place of interest.

Some embodiments may further modify non-spatial, time-based attributes of the selected place of interest based on the current location history, as indicated by block 176. In some embodiments, the attributes of places of interest may include a population density score, for instance, a population density score during one of the above-described time tile durations, and some embodiments may determine a current population of the selected place of interest based on a plurality of location histories analyzed with the process 150 and timestamps of the geolocations (collectively for a given history) indicating a duration of time in which the corresponding mobile computing device is inferred to have been at the place of interest. Some embodiments may infer a mobile computing device to beat a at place of interest over a duration of time by determining that there are more than a threshold amount of time stamped geolocations corresponding to the place of interest, for instance, that led to the strongly connected component that is currently selected, and that those time stamped geolocations are less than a threshold amount of time apart and are not interrupted by a time stamped geolocation in their sequence that is more than a threshold distance away or is not attributable to the strongly connected component currently being processed. Some embodiments may infer a population score for the place of interest over time and store those scores in association with the place of interest. In another example, attributes of a user profile associated with the location history may be attributed to the place of interest, for instance, designating the place of interest as scoring relatively highly for users having an affinity for golf during weekend hours.

Some embodiments may proceed to store the modified attributes in association with the selected place of interest, as indicated by block 178, and store the selected place of interest in association with an identifier of the mobile computing device of the current location history, as indicated by block 180. Some embodiments may then return to block 166 to determine whether there are more strongly connected components to process.

In some embodiments, the process 150 may generate updated user profiles and updated records of places of interest. In some cases, these records may be accessed in the above-described operations by which user profiles are modified, used, audiences are formed, sites are selected, bids for advertisement auctions are determined, or the like. These and other techniques may cause content to be selected and sent to a mobile computing device or another computing device associated with the same user or other users, in some cases during subsequent sessions.

Figure 8:
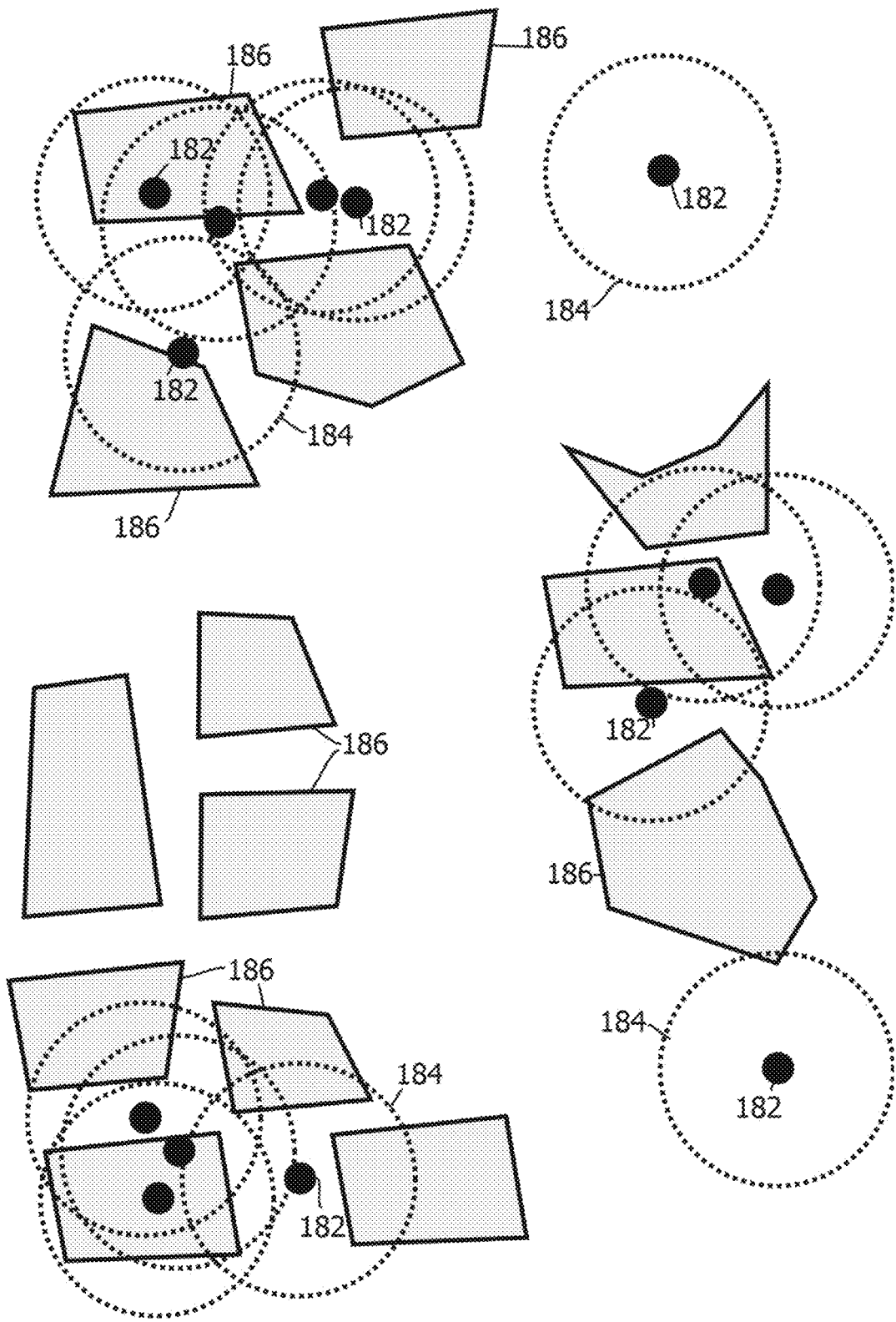
FIG. 8 is a diagram of a geographic area that shows a use case of the process of FIG. 7 in accordance with some embodiments of the present techniques.

FIG. 8 depicts a simplified example of a use case. Commercial embodiments are expected to be substantially more complex and deal with substantially larger data sets, including geolocation histories having more than 100 million geolocations for more than 10 million users and potentially applying to more than 1 million places of interest. In this example, reported geolocations in a location history are designated with element number 182, while confidence areas of those geolocation's are designated with element number 184. Bounding polygons for places of interest are designated with element number 186. As shown, geolocations and confidence areas tend to cluster, but individual confidence areas often overlap multiple places of interest, making it difficult to determine whether a device is dwelling at any one of several nearby places of interest.

Figure 9:
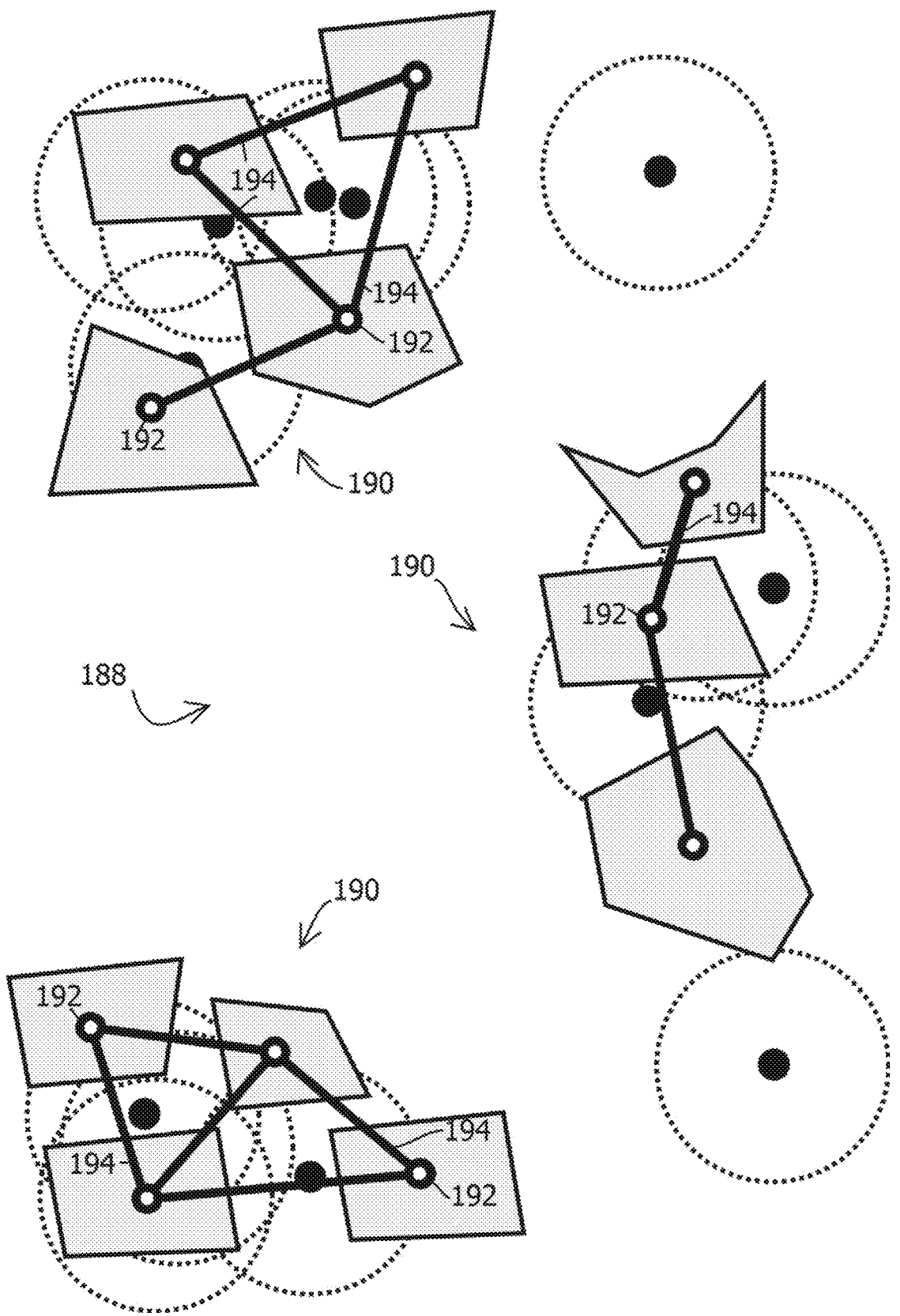
FIG. 9 is a diagram that shows program state of the process of FIG. 7 in the use case of FIG. 8 in accordance with some embodiments of the present techniques.

FIG. 9 shows an example of program state that may arise from the use case to FIG. 8 in the process of FIG. 7. FIG. 9 shows a device-dwell graph 188 having a plurality of strongly connected components 190, in this case three of them. The illustrated strongly connected components have nodes 192 corresponding to the places of interest, and edges 194 corresponding to the instances in which to places of interest are responsive to a given reported geolocation in its confidence area. In some cases, multiple reported geolocations may correspond to the same edge, in which cases the above-described attributes of the edges may some the values of multiple geolocation measurements, which in some cases may be part of calculating an average, such as an average probability for each of the places of interest connected by an edge. Or some embodiments may determine some other measure of central tendency as an attribute of the edges, like a mode or median probability across the set of geolocation measurements attributable to the edge. As shown, the strongly-connected components 190 reduce the set of places of interest that warrant consideration, and attributes of edges may be used in the manner described above to select among those candidates that remain.

Figure 10:
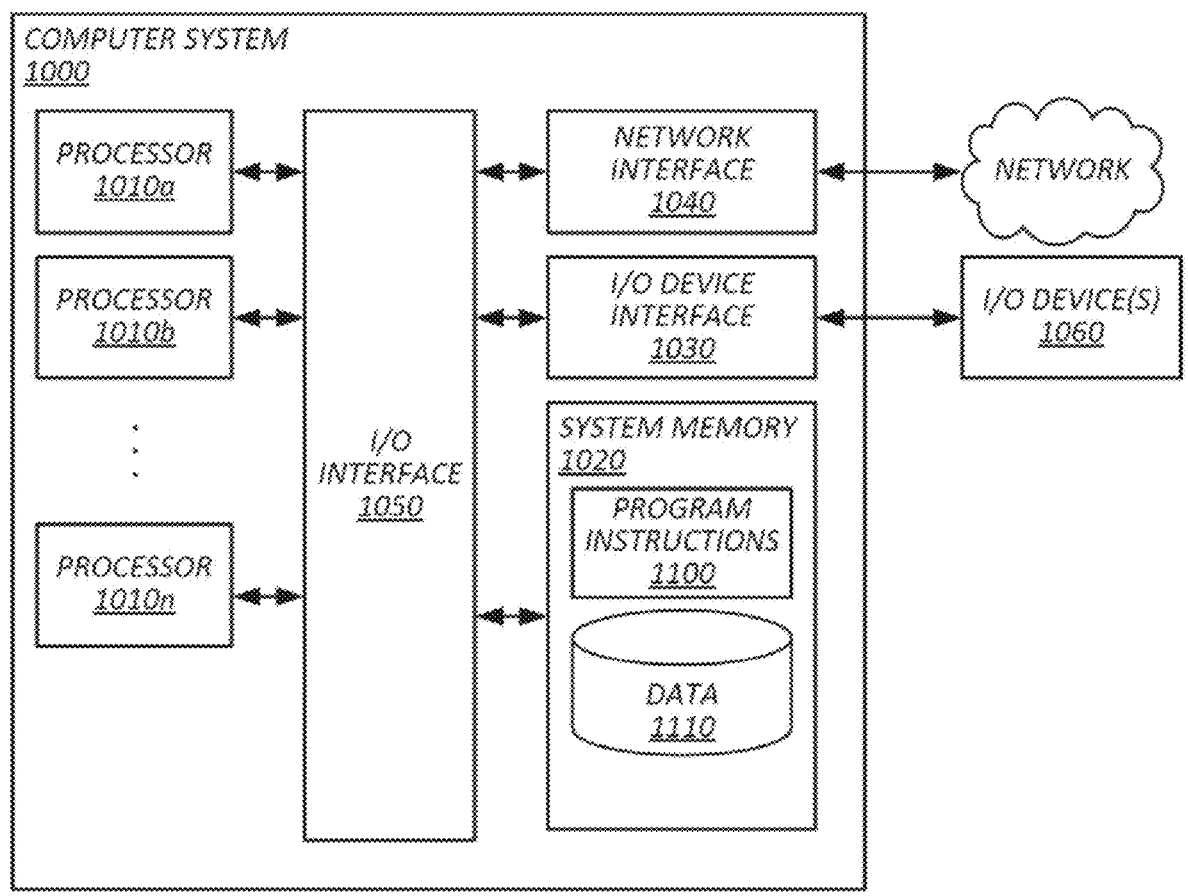
FIG. 10 shows an example of a computing device by which the above systems may be implemented.

FIG. 10 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

What is claimed is:

1. A tangible, non-transitory, machine-readable medium storing instructions that when executed by one or more processors effectuate operations to infer a geographic place of interest visited by a mobile computing device based on geolocation measurements of the mobile computing device that are individually too inaccurate to determine whether the mobile computing device is at the geographic place of interest or other adjacent geographic places of interest, the operations comprising:
   obtaining, with one or more processors, a location history of a mobile computing device, wherein:
      the location history comprises a plurality of time-stamped geolocations of the mobile computing device determined based on wireless signals received by the mobile computing device;
      the time-stamped geolocations have respective geographic confidence areas associated therewith;
      at least some of the time-stamped geolocations indicate a less than 80% probability that the mobile computing device is within 10 meters of a respective time-stamped geolocation at a time at least some wireless signals upon which the respective time-stamped geolocation is determined were received by the mobile computing device; and
      the obtained location history includes time-stamped geolocations that collectively span a duration of time greater than one minute;
   for each of the geographic confidence areas of the time-stamped geolocations, determining, with one or more processors, a respective set of places of interest geographically overlapping the respective confidence area by:
      querying a geographic information system for places of interest that geographically overlap the respective geographic confidence areas; and
      receiving the respective set of places of interest in a response to the query from the geographic information system, wherein:
         the respective places of interest are specified by a respective bounding polygon in which vertices of the respective bounding polygon correspond to geographic coordinates; and
         the respective bounding polygons define perimeters of geographic areas of the respective places of interest for which overlap is determined;
   forming, with one or more processors, based on the determined sets of places of interest, a device-dwell graph, wherein:
      nodes of the device-dwell graph correspond to respective places of interest in the determined sets of places of interest;
      edges of the device-dwell graph connect respective pairs of the nodes; and
      edges of the device-dwell graph correspond to respective co-occurrences of places of interest in respective determined sets of places of interest, such that a given edge is based on a given time-stamped geolocation having a given geographic confidence area that overlaps a given pair of places of interest that correspond to a given pair of nodes connected by the given edge;
   determining, with one or more processors, based on the device-dwell graph, a plurality of strongly connected components of the device-dwell graph, wherein:
      each strongly connected component is a subgraph of the device-dwell graph;
      each strongly connected component comprises a plurality of nodes; and
      each node in each strongly connected component is reachable by every other node in the respective strongly connected component via edges of the respective strongly connected component;
   for each strongly connected component, selecting, with one or more processors, a place of interest from among a plurality of places of interest corresponding to nodes of the respective strongly connected component as a place of interest visited by the mobile computing device, wherein selecting comprises determining that at least some places of interest corresponding to nodes of the respective strongly connected component were not visited by the mobile computing device at times of at least some of the time-stamped geolocations; and
   storing, with one or more processors, the selected places of interest in memory in association with the mobile computing device.

2. The method of claim 1, wherein:
edges of the device-dwell graph correspond to probabilities that the mobile computing device is in at least one of two places of interest corresponding to respective pairs of nodes connected by respective edges.

3. The method of claim 2, wherein:
forming the device-dwell graph comprises pruning edges of the device-dwell graph indicative of less than a threshold probability.

4. The method of claim 2, wherein:
a given one of the probabilities is based on a plurality of the time-stamped geolocations.

5. A method, comprising:
obtaining, with one or more processors, a location history of a mobile computing device, wherein:
   the location history comprises a plurality of time-stamped geolocations of the mobile computing device determined based on wireless signals received by the mobile computing device;
   the time-stamped geolocations have respective geographic confidence areas associated therewith;
   at least some of the time-stamped geolocations indicate a less than 80% probability that the mobile computing device is within 10 meters of a respective time-stamped geolocation at a time at least some wireless signals upon which the respective time-stamped geolocation is determined were received by the mobile computing device; and
   the obtained location history includes time-stamped geolocations that collectively span a duration of time greater than one minute;
for each of the geographic confidence areas of the time-stamped geolocations, determining, with one or more processors, a respective set of places of interest geographically overlapping the respective confidence area by:

querying a geographic information system for places of interest that geographically overlap the respective geographic confidence areas; and receiving the respective set of places of interest in a response to the query from the geographic information system, wherein:

the respective places of interest are specified by a respective bounding polygon in which vertices of the respective bounding polygon correspond to geographic coordinates; and the respective bounding polygons define perimeters of geographic areas of the respective places of interest for which overlap is determined;

forming, with one or more processors, based on the determined sets of places of interest, a device-dwell graph, wherein:

nodes of the device-dwell graph correspond to respective places of interest in the determined sets of places of interest;

edges of the device-dwell graph connect respective pairs of the nodes; and edges of the device-dwell graph correspond to respective co-occurrences of places of interest in respective determined sets of places of interest, such that a given edge is based on a given time-stamped geolocation having a given geographic confidence area that overlaps a given pair of places of interest that correspond to a given pair of nodes connected by the given edge;

determining, with one or more processors, based on the device-dwell graph, a plurality of strongly connected components of the device-dwell graph, wherein:

each strongly connected component is a subgraph of the device-dwell graph;

each strongly connected component comprises a plurality of nodes; and each node in each strongly connected component is reachable by every other node in the respective strongly connected component via edges of the respective strongly connected component;

for each strongly connected component, selecting, with one or more processors, a place of interest from among a plurality of places of interest corresponding to nodes of the respective strongly connected component as a place of interest visited by the mobile computing device, wherein selecting comprises determining that at least some places of interest corresponding to nodes of the respective strongly connected component were not visited by the mobile computing device at times of at least some of the time-stamped geolocations; and storing, with one or more processors, the selected places of interest in memory in association with the mobile computing device.

6. The method of claim 5, comprising:

determining places of interest visited by more than 10 million computing devices based on more than 100 million time-stamped geolocations in more than 10 million respective location histories based on more than 10 million respective device-dwell graphs of the more than 10 million computing devices, wherein:

at least some of the location histories comprise more than 100 time-stamped geolocations measured over a duration of more than one week; and at least some of the time-stamped geolocations indicate a less than 80% probability that the mobile computing device is within 50 meters of a respective time-stamped geolocation at a time at least some wireless signals upon which the respective time-stamped geolocation is determined were received by the mobile computing device.

7. The method of claim 5, comprising:

determining a spatial attribute of the selected place of interest based on the location history;

determining a non-spatial, time-based attribute of the selected place of interest based on the location history; and storing the spatial attribute and the non-spatial, time-based attribute in association with the selected place of interest in the geographic information system.

8. The method of claim 5, comprising:

modifying a geolocation of a vertex of a bounding polygon of the place of interest based on a time-stamped geolocation in the geolocation history.

9. The method of claim 5, comprising searching the geographic information system responsive to the query, wherein searching comprises:

determining one or more geographic tiles that overlap the respective geographic confidence area; and retrieving one or more places of interest that overlap the one or more geographic tiles from an index that comprises more than 200,000 associations that associate respective ones of more than 1 million tiles with respective ones of more than 100,000 places of interest.

10. The method of claim 5, wherein:

the geographic confidence areas are probability surfaces that map geographically varying probabilities to geolocations within the geographic confidence areas, the geographically varying probabilities being probabilities that the mobile computing device is at a corresponding geolocation under a point on the respective probability surface within the geographic confidence area given one or more corresponding time-stamped geolocations in the location history; and forming the device-dwell graph comprises adding an edge to the device-dwell graph in response to determining that a pair of nodes correspond to places of interest with greater than a threshold probability of having been visited by the mobile computing device.

11. The method of claim 10, wherein determining that the pair of nodes correspond to places of interest with greater than the threshold probability of having been visited by the mobile computing device comprises:

integrating a given probability surface of another given geographic confidence area over a geographic area within a perimeter of the place of interest of one of the pair of nodes.

12. The method of claim 5, wherein:

at least some of the geographic confidence areas are determined based a type of geolocation measurement corresponding to a respective time-stamped geolocation, the type being one of a plurality of different types of geolocation measurements upon which different ones of time-stamped geolocations are based, the plurality of different types including at least two of: cell tower triangulation, identifiers of wireless transmitters in local area networks or Bluetooth beacons, or GPS.

13. The method of claim 5, wherein:

at least some of the geographic confidence areas are based on historical measurements of inaccuracy of geolocation measurements at corresponding geolocations.

14. The method of claim 5, wherein:

selecting the place of interest comprises classifying a corresponding strongly connected component including a node corresponding to the selected place of interest as being a strongly connected component representing a device dwell based on:
an amount of time-stamped geolocations corresponding to the respective strongly connected component,
an amount of time between at least some time stamps of the corresponding time-stamped geolocations, and
an amount of time spanned by corresponding time-stamped geolocations less than a threshold amount of time apart and in a sequence that is not interrupted by more than a threshold amount of time-stamped geolocations in the location history that do not correspond to the respective strongly connected component.

15. The method of claim 5, wherein:
determining the plurality of strongly connected components comprises determining a sequence of groups places of interest, each group of places of interest comprises a plurality of candidate places of interest potentially visited by the mobile computing device.

16. The method of claim 5, wherein determining the plurality of strongly connected components comprises:
initialize a list of nodes of the device-dwell graph as having not been visited; and
repeatedly selecting un-visited nodes in the list as a current node and performing a recursive search of the device-dwell graph with a recursive search routine from the current node to identify nodes reachable from the current node, where the recursive search routine comprises visiting nodes sharing an edge with the current node, designating nodes visited during the recursive search as part of a strongly connected component, and calling the recursive search routine with the visited node designated as the current node.

17. The method of claim 5, wherein determining the respective set of places of interest geographically overlapping the respective confidence area comprises:
clustering the time-stamped geolocations with a density-based clustering algorithm according to both time and geolocation to form a cluster; and
determining a convex hull of confidence areas of geolocations in the cluster, wherein the query to the geographic information system is for places of interest overlapping the convex hull.

18. The method of claim 5, wherein the selected place of interest is stored in association with a user profile having one or more attributes formed with steps for training a decision tree or classification tree.

19. The method of claim 5, comprising:
classifying the selected place of interest as a residential dwelling based on steps for classifying residential dwellings.

20. The method of claim 5, comprising:
steps for using the selected place of interest to cause content to be sent to the mobile computing device.

* * * * *